United States Patent
Gregg et al.

(10) Patent No.: US 6,681,254 B1
(45) Date of Patent: *Jan. 20, 2004

(54) METHOD OF CONTROLLING THE FLOW OF INFORMATION BETWEEN SENDERS AND RECEIVERS ACROSS LINKS BEING USED AS CHANNELS

(75) Inventors: Thomas A. Gregg, Highland, NY (US); Kulwant M. Pandey, Lagrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/151,051

(22) Filed: Sep. 10, 1998

(51) Int. Cl.[7] .............................................. G06F 15/16
(52) U.S. Cl. ........................ 709/232; 709/217; 709/237
(58) Field of Search ................................ 714/748, 749; 709/203, 227, 232, 237, 217, 219; 370/394

(56) References Cited

U.S. PATENT DOCUMENTS

| | | | |
|---|---|---|---|
| 4,617,657 A | 10/1986 | Drynan et al. | 370/394 |
| 4,969,092 A | 11/1990 | Shorter | 709/102 |
| 5,317,739 A | 5/1994 | Elko et al. | 395/650 |
| 5,442,749 A | 8/1995 | Northcutt et al. | 709/219 |
| 5,490,152 A | 2/1996 | Gregg et al. | 371/32 |
| 5,561,809 A | 10/1996 | Elko et al. | 395/800 |
| 5,604,487 A | 2/1997 | Frymier | 340/825.07 |
| 5,613,068 A | 3/1997 | Gregg et al. | 395/200.13 |
| 5,706,432 A | 1/1998 | Elko et al. | 395/200.08 |
| 5,754,771 A | 5/1998 | Epperson et al. | 709/203 |
| 5,757,297 A | 5/1998 | Ferraiolo et al. | 341/100 |
| 5,764,890 A | 6/1998 | Glasser et al. | 713/202 |
| 5,864,542 A | 1/1999 | Gupta et al. | 370/257 |
| 5,909,437 A | 6/1999 | Rhodes et al. | 370/349 |
| 5,911,044 A | 6/1999 | Lo et al. | 709/203 |
| 5,930,704 A | 7/1999 | Kay | 455/419 |
| 5,938,786 A | 8/1999 | Gregg | 714/748 |
| 5,944,797 A | 8/1999 | Gregg et al. | 709/237 |
| 6,112,323 A * | 8/2000 | Meizlik et al. | 714/748 |
| 6,170,045 B1 | 1/2001 | Bobak et al. | 711/169 |

* cited by examiner

*Primary Examiner*—Zarni Maung
*Assistant Examiner*—Paul Kang
(74) *Attorney, Agent, or Firm*—Lily Neff, Esq.; Heslin Rothenberg Farley & Mesiti P.C.

(57) ABSTRACT

Controlling the flow of information between senders and receivers across links being used as channels. In one example, a self-timed interface link is adapted to be used as a channel. Such an interface is referred to as an integrated cluster bus. The flow control for the integrated cluster bus includes, for instance, a Data Request packet that indicates to the transmitter of data that it can now send the data; a continue indicator that specifies that more data is to follow; and a sequence indicator that is used to determine if a particular message is in proper sequence order. The integrated cluster bus does not require large data buffers and offers low latency messaging.

16 Claims, 14 Drawing Sheets

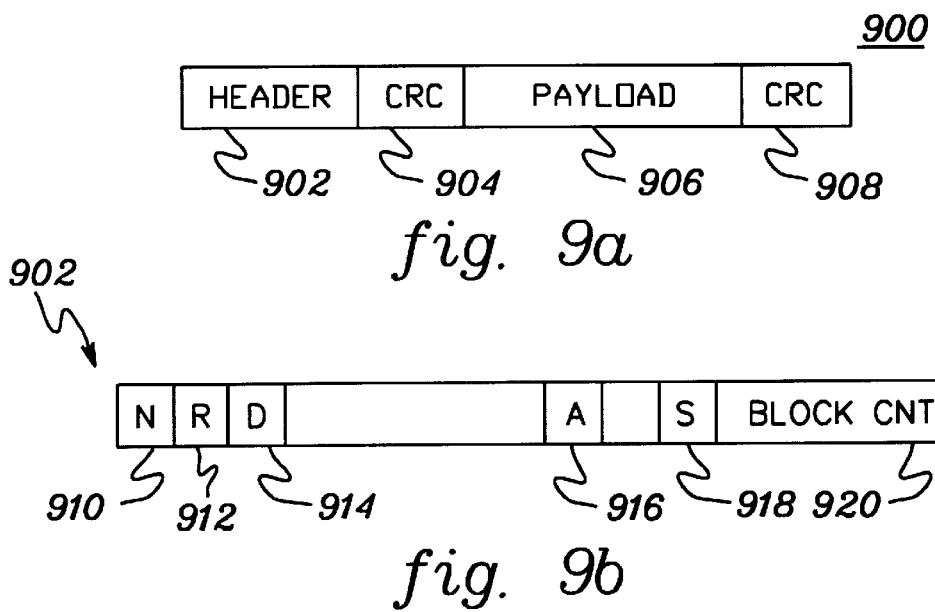
fig. 9a
fig. 9b
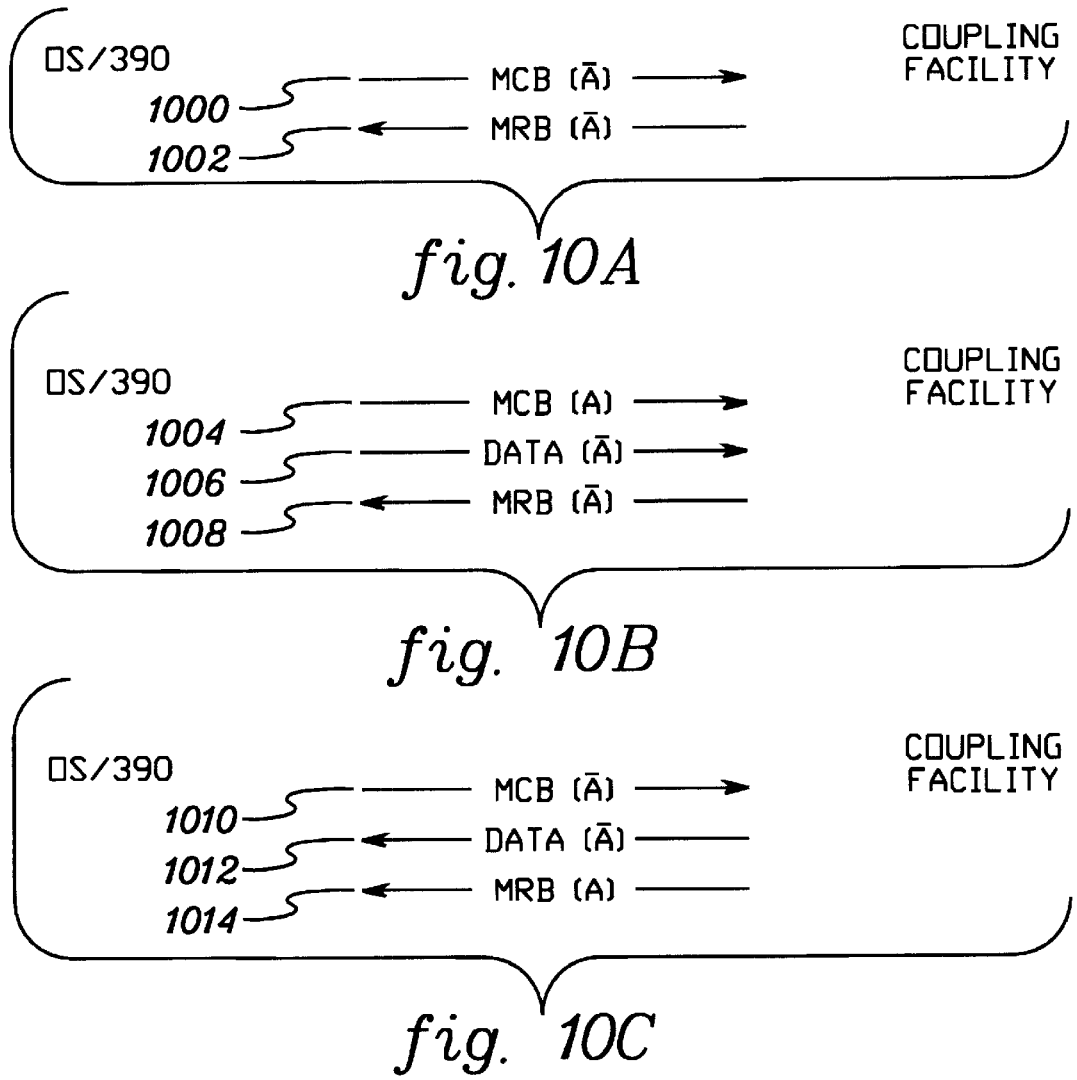
fig. 10A
fig. 10B
fig. 10C

METHOD OF CONTROLLING THE FLOW OF INFORMATION BETWEEN SENDERS AND RECEIVERS ACROSS LINKS BEING USED AS CHANNELS

CROSS-REFERENCE TO RELATED APPLICATIONS

This application contains subject matter which is related to the subject matter of the following applications, each of which is assigned to the same assignee as this application and filed on the same day as this application. Each of the below listed applications is hereby incorporated herein by reference in its entirety:

"SYSTEM OF CONTROLLING THE FLOW OF INFORMATION BETWEEN SENDERS AND RECEIVERS ACROSS LINKS BEING USED AS CHANNELS," by Gregg et al., Ser. No. 09/150,942, and "CONTROLLING THE FLOW OF INFORMATION BETWEEN SENDERS AND RECEIVERS ACROSS LINKS BEING USED AS CHANNELS," by Gregg et al., Ser. No. 09/151,117.

TECHNICAL FIELD

This invention relates, in general, to data communication and, in particular, to controlling the flow of information between senders of information and receivers of that information, when the information is being forwarded across links being used as channels.

BACKGROUND ART

Communication between computer systems usually involves a sending system (sender) sending a command to a receiving system (receiver) over a link used to couple the sender and the receiver. The receiving system then, typically, sends a response back over the link to the sending system.

One example of a link used by International Business Machines Corporation to communicate between a sender and a receiver is an intersystem channel link. In particular, an intersystem channel link couples an intersystem channel adapter on one system (e.g., a central processor) that may be used for sending or receiving messages with an intersystem channel adapter on another system (e.g., a coupling facility that contains data shared by any central processor coupled thereto) that may also be used for sending or receiving messages.

An intersystem channel link supports connections up to approximately 20 kilometers, and the propagation time on the link (at 20 kilometers), when using fiber optic conductors, is approximately 100 microseconds in each direction. To minimize message latency, a minimum number of round trip acknowledgements is used, and thus, large data buffers at each end of the link are needed for flow control. In one example, a message exchange requires only one single round trip over the link.

As more and more data is desired to be included with the message, larger data buffers are needed to maintain the single round trip flow control. However, eventually, the expense of large buffers becomes prohibitive and the flow control is modified to add intermediate acknowledgement exchanges to throttle the data transfer preventing the buffers from overrunning. These extra exchanges, though, significantly increase message latency.

Based on the foregoing, a need exists for a more direct communication link between senders and receivers of information. Further, a need exists for a communication link that does not need to couple channel adapters, but still may act as a channel. That is, a need exists for a communication protocol in which the advantages of a channel (e.g., having a direct memory adapter engine and offering protection of memory) may be realized. Additionally, a need exists for a communication protocol that does not require large data buffers and does not significantly add to message latency.

SUMMARY OF THE INVENTION

The shortcomings of the prior art are overcome and additional advantages are provided through the provision of a method of controlling the flow of information between senders and receivers of data. The method includes, for instance, initiating, by a first system, a sending of a request, via a link, to a second system, in which the request has one or more data items associated therewith that are not sent with the request; indicating that a receiver of data is prepared to receive the one or more data items from a sender of data, wherein the receiver is either the first system or the second system depending on the request, and the sender is the other of the first system or the second system; forwarding, in response to the indicating, the one or more data items; and wherein the link is being used as a channel in that the link is not stopped while the receiver is preparing for the one or more data items.

In another aspect of the present invention, a method of controlling the flow of information across links between senders and receivers is provided. The method includes, for instance, including in a packet a sequence number usable in maintaining delivery order of the packet. The packet, however, does not include a memory address and does not require an explicit individual response. The packet is sent from a sender to a receiver across a link, and the sequence number is used to determine if the packet is in proper order for processing by the receiver.

In another aspect of the present invention, a method of controlling the flow of information across links between senders and receivers is provided. The method includes, for instance, including in a packet a continue indicator usable in determining whether another packet is to follow; sending the packet from a sender to a receiver across a link; and using the continue indicator to determine if the another packet is to follow.

Advantageously, the flow control capabilities of the present invention provide a more direct communication path between senders and receivers. Further, the flow control protocol does not require large data buffers and offers low latency messaging. Thus, the present invention is less expensive than other communication protocols.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

FIG. 9a depicts one embodiment of a frame sent across an intersystem channel;

FIG. 9b depicts one example of a header of the frame of FIG. 9a;

FIGS. 10a–10c illustrate examples of the flow of messages between an OS/390 processor and a coupling facility, in accordance with the principles of the present invention;

BEST MODE FOR CARRYING OUT THE INVENTION

In accordance with the principles of the present invention, the flow of information between senders and receivers is being controlled across links that are being used as channels.

Figure 1:
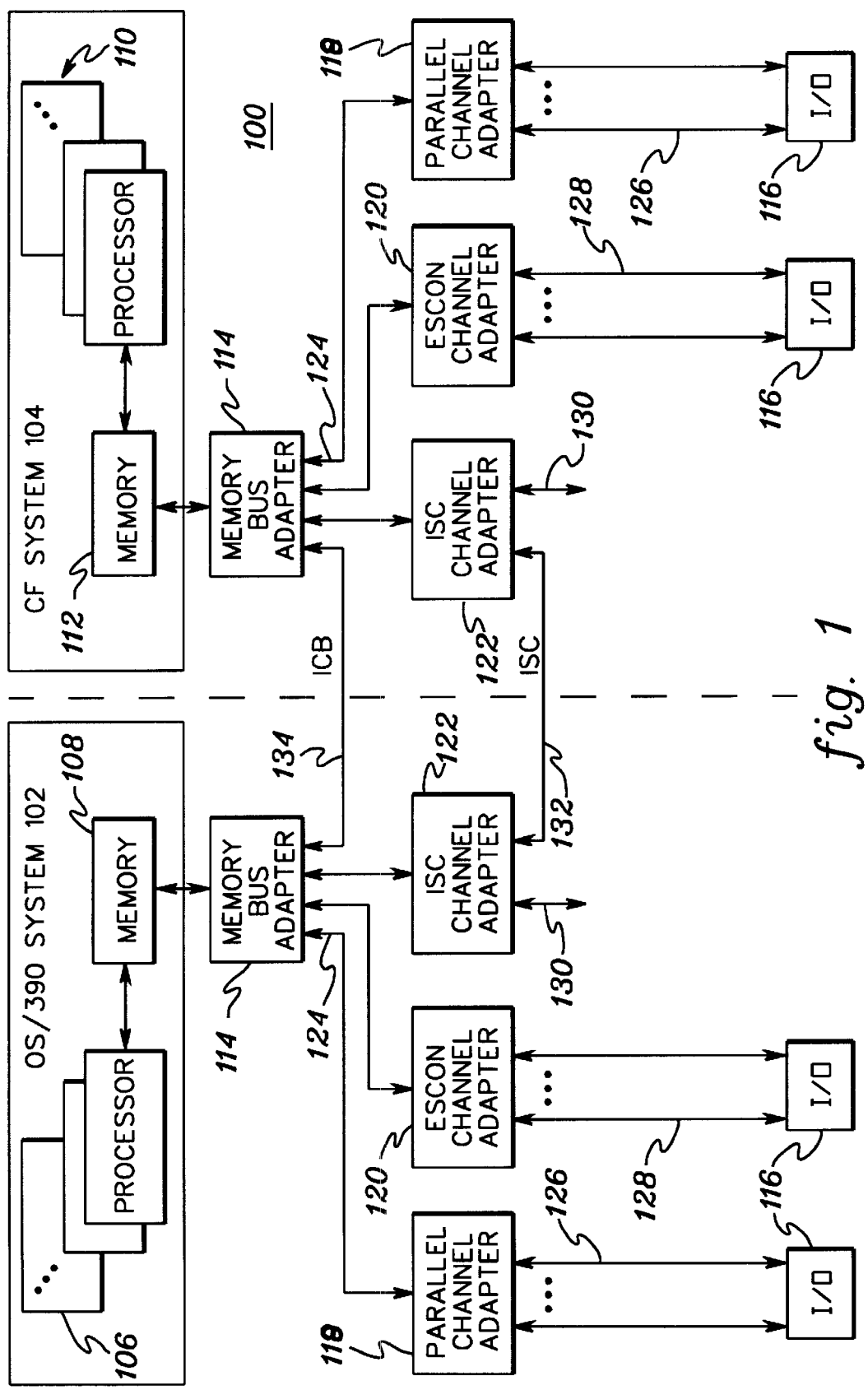
FIG. 1 depicts one example of a computer environment incorporating and using the flow control capabilities of the present invention.

One embodiment of a computing environment incorporating and using the flow control capabilities of the present invention is depicted in FIG. 1 and described in detail herein. Computing environment 100 is based, for instance, on the Enterprise Systems Architecture (ESA)/390 offered by International Business Machines Corporation. ESA/390 is described in an IBM Publication entitled Enterprise Systems Architecture/390 Principles of Operation, IBM Publication No. SA22-7201-04, June 1997, which is hereby incorporated herein by reference in its entirety.

Computing environment 100 includes, for instance, one or more central processing complexes (CPCs) 102 coupled to at least one coupling facility 104, each of which is described below.

Each central processing complex 102 includes one or more central processors 106 (central processing units) and main memory 108, which is accessed by the central processors. Each central processor may execute an operating system, such as the OS/390 or Multiple Virtual Storage (MVS)/ESA operating system offered by International Business Machines Corporation.

Coupling facility 104 is a sharable facility, which includes one or more central processors 110 and storage 112, which is indirectly accessible by processors 106 and directly accessible by processors 110. Each central processor 110 may execute coupling facility control code to perform operations requested by processors 106. In one embodiment, coupling facility 104 is a structured-external storage processor (SES).

Aspects of the operation of a coupling facility are described in detail in such references as Elko et al., U.S. Pat. No. 5,317,739, entitled "Method and Apparatus For Coupling Data Processing Systems", issued May 31, 1994; Elko et al., U.S. Pat. No. 5,561,809, entitled "In A Multiprocessing System Having A Coupling Facility, Communicating Messages Between The Processors And The Coupling Facility In Either A Synchronous Operation Or An Asynchronous Operation", issued on Oct. 1, 1996; Elko et al., U.S. Pat. No. 5,706,432, entitled "Mechanism For Receiving Messages At A Coupling Facility", issued Jan. 6, 1998; and the patents and applications referred to therein, all of which are hereby incorporated herein by reference in their entirety.

Multiple central processing complexes and coupling facilities may be interconnected. Further, each central processing complex and/or coupling facility processors may be logically partitioned, such that it can run multiple instances of the OS/390 and/or coupling facility control code.

Central processing complex 102 and coupling facility 104 are each coupled to a memory bus adapter 114. Memory bus adapter 114 provides assistance in fetching data from and storing data in memory. In particular, the memory bus adapter is used to couple the memory to various peripheral components, such as input/output (I/O) devices 116. As examples, the input/output devices include disk drives, tape drives, local area network (LAN) attachments, and wide area network (WAN) attachments.

In one embodiment, in order to couple the memory bus adapters to the I/O devices, each memory bus adapter 114 is coupled to one or more channel adapters 118, 120 via memory interfaces, referred to as self-timed interfaces (STIs) 124. The channel adapters then provide the I/O interface attachment points to the I/O devices. As examples, one of the channel adapters is a parallel channel adapter 118, which provides a parallel channel interface 126 to I/O devices 116; and another channel adapter is an ESCON channel adapter 120, which provides an ESCON channel interface 128 to I/O devices 116. In addition to the above, an intersystem channel (ISC) adapter 122, which provides an intersystem channel interface 130 to, for example, another central processing complex, is also coupled to the memory bus adapter via STI 124.

Channel adapters 118, 120, 122 are, for instance, direct memory adapter (DMA) engines, which move data to and from memory 108, 112 without any direct involvement of any of processors 106, 110. They also provide protection from the peripherals or other components storing in any arbitrary location in memory. The peripherals or other components can only store into the memory locations known to the channel adapters, and those locations are determined by the programs running in processors 106, 110. The channel adapters are considered a trusted, integral part of the central processing complex.

As described above, the channel adapters are coupled to memory bus adapter 114 via self-timed interface 124. In one example, self-timed interface 124 includes a link that operates at relatively short distances (about 10 meters). The link is comprised of eight data signals, one combination parity and tag signal, and a clock signal in each direction. The maximum link propagation delay is about 40 nanoseconds, and thus, the time it takes to transmit a single 128 byte memory line is about 500 nanoseconds (including the packet overhead of headers and checking fields).

Figure 2:
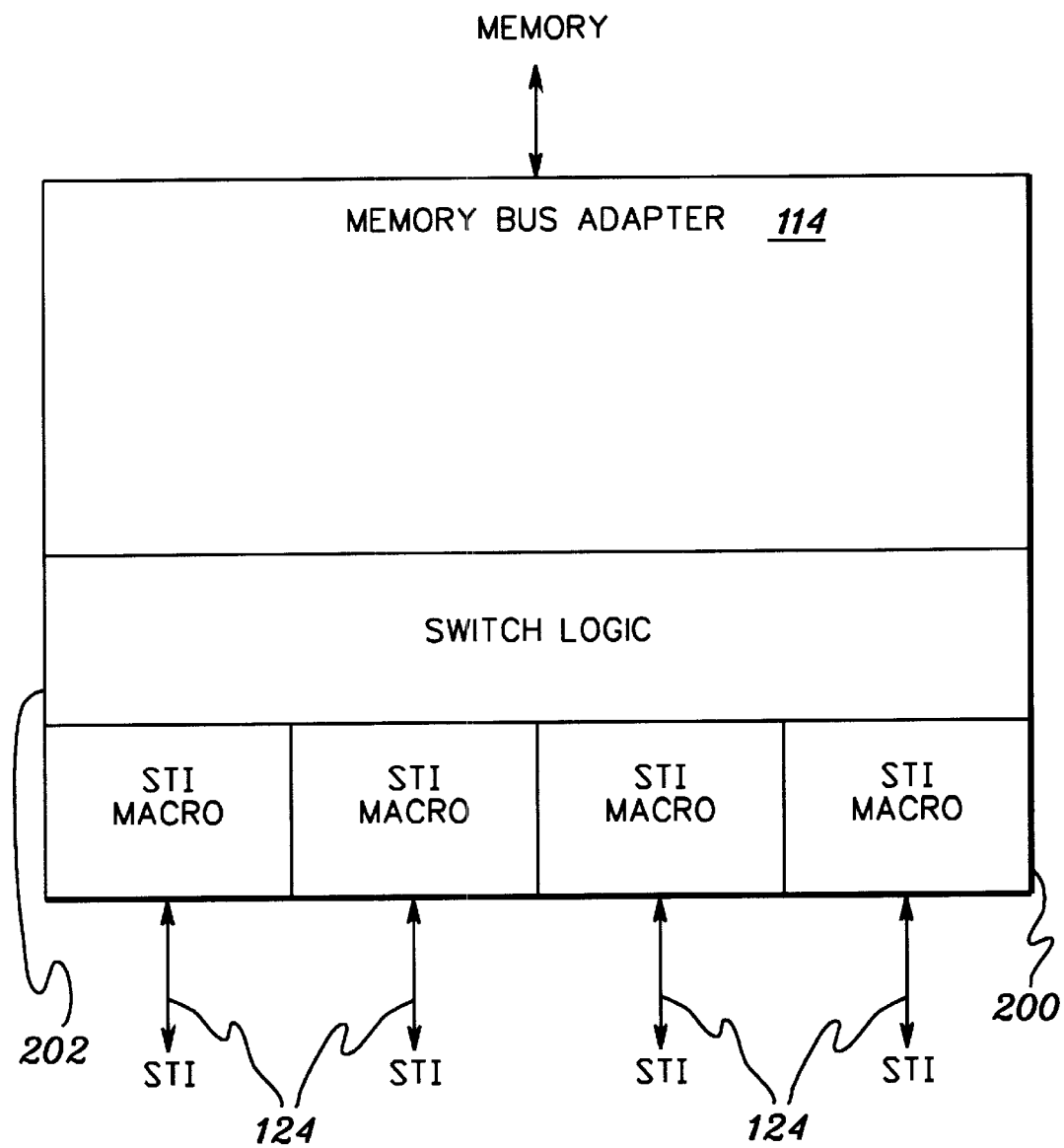
FIG. 2 depicts one embodiment of a memory bus adapter of FIG. 1.

Coupled to one end of the STI link is memory bus adapter 114, which is described in further detail with reference to FIG. 2. Memory bus adapter 114 includes one or more STI macros 200 and switch logic 202. In one embodiment, each macro is coupled to one end of a self-timed interface link 124.

Each STI macro is responsible for retiming the data and parity/tag signals of the link to the clock signal. The retiming compensates for propagation time variations of the various signals so that the data and parity/tag signals can be coherently sampled by the clock signal. The propagation time variations are due to differences in the signal drivers, receivers and wire. (STI is further described in U.S. Pat. No. 5,757,297, entitled "Method and Apparatus for Recovering a Serial Data Stream Using a Local Clock", Ferraiolo et al., issued on May 26, 1998; and U.S. patent application Ser. No. 08/660,648, now U.S. Pat. No. 5,859,881, entitled "Adaptive Filtering Method and Apparatus to Compensate For a Frequency Difference Between Two Clock Sources", Ferraiolo et al., filed on Jun. 7, 1996, each of which is assigned to International Business Machines Corp. and each of which is hereby incorporated herein by reference in its entirety).

Figure 3A:
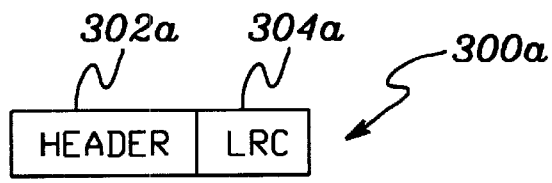
FIG. 3a depicts one example of a packet managed by a self-timed interface, in accordance with the principles of the present invention.
Figure 3B:
FIG. 3b depicts another example of a packet managed by a self-timed interface, in accordance with the principles of the present invention.

STI macros 200 are also responsible for transmitting, receiving, buffering, and regulating packets and control sequences over STI. Examples of packets managed by STI are depicted in FIGS. 3a–3b and described below.

Packet 300a (FIG. 3a) includes, for instance, a header 302a and a longitudinal redundancy check 304a. Header 302a has a variable length (e.g., 8 or 16 bytes) and includes various fields relevant for the particular packet being sent. For instance, header 302a may include a buffer number indicating which buffer in the STI macro is to receive the packet, and a header length count indicating the length of the header.

Packet 300b also includes, for example, a header 302b and a longitudinal redundancy check 304b, as well as a payload 306 and a further longitudinal redundancy check 308. In this case, header 302b includes a payload length count indicating the length of the payload (e.g., data), in addition to the buffer number and header length count. Payload 306 is, for example, variable in length in increments of 4 bytes, and has a maximum length of 128 bytes (the memory line size).

After a packet is transmitted or when there are no packets or control information to be transmitted, an idle sequence is transmitted.

To send and receive packets over STI, each STI macro 200 includes, for example, four transmit header buffers, four receive header buffers, two transmit payload buffers and two receive payload buffers. Each payload buffer is tied to one of the header buffers. In one embodiment, each of the header buffers has space for a 16 byte header, and each of the payload buffers has space for 128 bytes (a memory line) of payload information. The payload buffers are sufficient to realize the full data rate of the link.

The low level flow control provided by the STI macros regulate the flow of packets as they travel through the payload and header buffers. Some of the bits in the packet headers are under exclusive control of the STI macros and others may be used by the STI user layer logic (such as channel adapters 118, 120, 122 and switch logic 202) for any purpose required.

Switch logic 202 (FIG. 2) is coupled to the STI macros. It is responsible for forwarding information received from the macros to memory and for passing information from memory to the STI macros.

Figure 4:
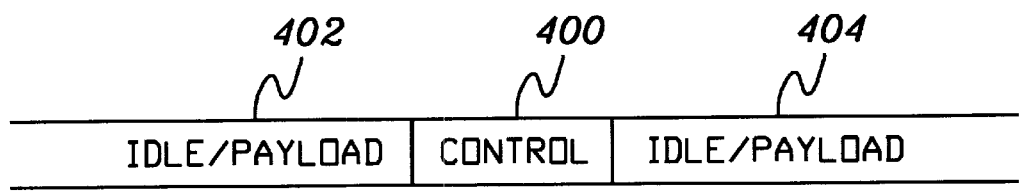
FIG. 4 depicts one example of a control word used in accordance with the principles of the present invention.

When a user layer, such as the switch logic, wants to send a packet, it queries the STI macro to determine the type of buffers available. If the desired buffer (header and payload or only a header) is available, the user layer places its information on the buffer(s), and tells the STI macro to proceed. The STI macro sends the packet to the other end of STI where it is placed in the receive buffer(s). The STI macro at the other end informs its user layer of the arrival of the packet, and the user layer unloads it. After the user layer unloads the packet, the STI macro sends a control word (e.g., an acknowledgement) back to the side of the STI originating the packet. One example of a control word is depicted in FIG. 4.

As shown, a control word 400 can be inserted anywhere either in an idle sequence 402 or within a packet 404. At the most basic level, STI macros move packets between user layers, and for each packet moved, there is a control word (acknowledgement) sent in the opposite direction after the packet has been successfully processed.

Negative acknowledgements in the form of control words, and additional control bits in the packet headers detect missing and/or damaged packets. In some cases, the STI macros can automatically retransmit a packet. This retransmission may cause the packets to be presented to the receiving user layer in an order different from the order that the sending user layer transmitted the packets. If the user layer is sensitive to the ordering, it is up to the user layer to determine the order.

Returning to FIG. 1, channel adapters 118, 120, 122 use STI as an interface to memory. Their basic operation is sending memory requests. Each memory request receives a response. For a memory fetch, the memory address is in the request and the response contains the data. For a memory store, the memory address and the data to be stored are in the request, and the response simply contains an indication of the successfulness of the store operation.

Figure 5:
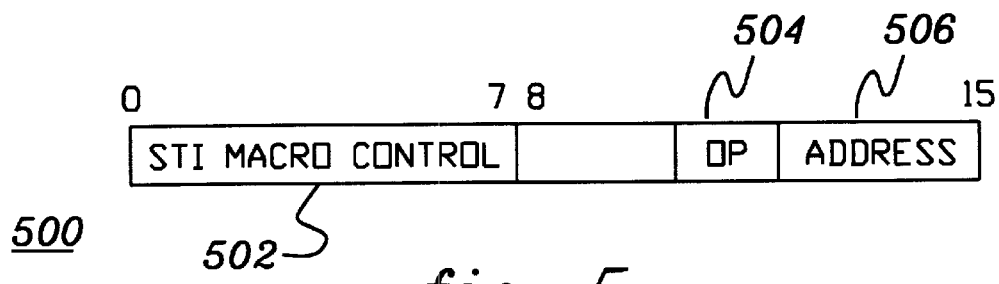
FIG. 5 depicts one example of a self-timed interface header for channel adapter memory requests, in accordance with the principles of the present invention.

One example of a STI header for channel adapter memory requests is depicted in FIG. 5. Header 500 includes, for instance, one or more STI macro controls and routing information 502, an operation code (store or fetch) 504 and a memory address 506. The op code and memory address comprise a command.

The STI macro controls and routing information include, for example, a STI macro buffer number, a header length count, and a data length count for the memory operation.

Figure 6:
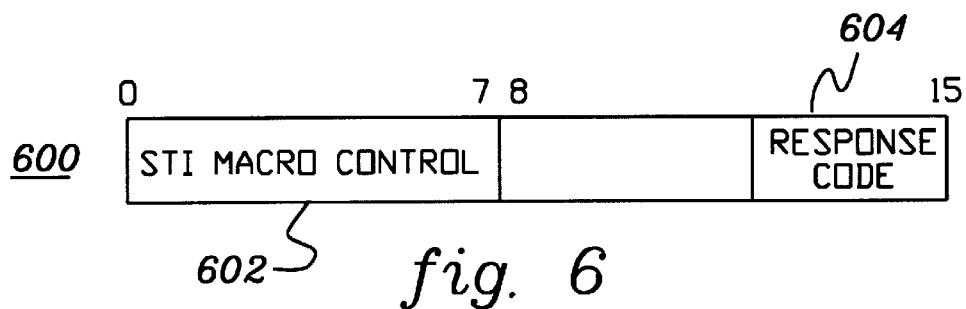
FIG. 6 depicts one example of a self-timed interface header for channel adapter memory responses, in accordance with the principles of the present invention.

One example of a STI header for channel adapter memory responses is depicted in FIG. 6. Header 600, which is similar to header 500, includes, for instance, one or more STI macro controls and routing information 602, and a memory response code 604. One response code is used to indicate a successful completion of a memory operation, while one or more other codes are used to indicate failures, such as an invalid memory address.

Figure 7:
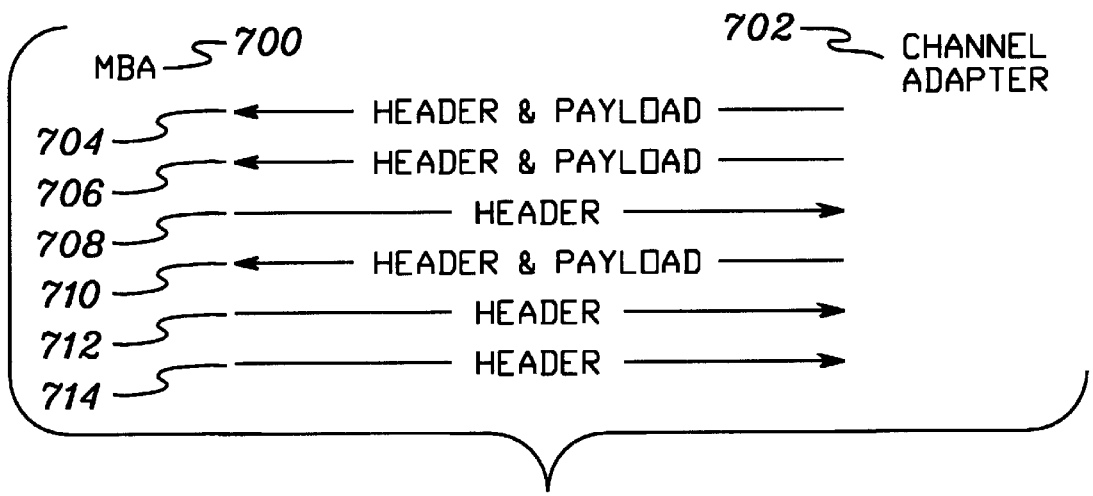
FIG. 7 depicts one embodiment of the flow of packets for an I/O input operation, in accordance with the principles of the present invention.

One example of the flow of packets for an I/O input (fetch or read) operation is depicted in FIG. 7. For clarity purposes, low level STI acknowledgements are not shown. The flow of information is between a memory bus adapter 700 and a channel adapter 702. The channel adapter receives data from the peripherals (not shown in this figure) and typically, buffers this information in the adapter. Memory addresses and control information within the channel adapter is used to generate the STI headers (e.g., header 500), and the buffered data are the payloads. A packet 704, including a header and a payload, is sent from adapter 702 to memory bus adapter 700. A further packet 706 is also sent from the channel adapter to the memory bus adapter. In this particular example, two storage requests are outstanding at the same time. A response packet 708 (e.g., header 600) is then sent from memory bus adapter 700 to channel adapter 702. This response is paired to the request having the same STI macro buffer number as the response. Thereafter, another request packet 710 is sent from the channel adapter to the memory bus adapter. Multiple exchanges are typically required, since the peripheral data is usually more than 128 bytes. Next, two other response packets 712, 714 are sent from the memory bus adapter to the channel adapter.

Figure 8:
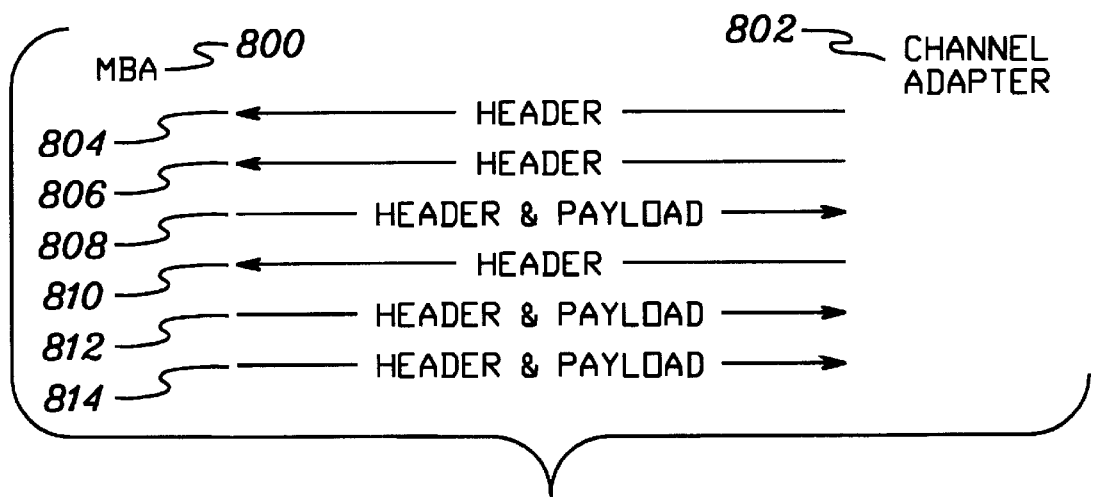
FIG. 8 depicts one embodiment of the flow of packets for an I/O output operation, in accordance with the principles of the present invention.

One example of the flow of packets for an I/O output (store or write) operation is depicted in FIG. 8. For clarity purposes, low level STI acknowledgements are not shown. Again, the flow of information is between a memory bus adapter 800 and a channel adapter 802. With a write operation, the channel adapter is instructed to send data to the peripherals. Memory addresses and control information within the channel adapters are, once again, used to generate the STI headers. Request packets 804, 806 (e.g., header 500) are sent from adapter 802 to memory bus adapter 800 requesting data that is to be written to the peripherals. Then, a response packet 808 (e.g., header 600) is sent from the memory bus adapter to the channel adapter, which provides the data. Thereafter, another request packet 810 is sent from the channel adapter to the memory bus adapter. In response to the request packets, response packets 812, 814 are sent from the memory bus adapter to the channel adapter.

Described in detail above is one embodiment of how communication between memory and peripherals within a computing system occurs. Now, the discussion turns to communication between computing systems that are coupled to one another. In particular, communication between central processing complex 102 and coupling facility 104 is described below.

In one example, communication between central processing complex 102 and coupling facility 104 is via an intersystem channel (ISC) 132 (FIG. 1). Intersystem channel 132 couples an intersystem channel adapter 122 on system 102 with an intersystem channel adapter 122 on system 104. ISC supports connections up to approximately 20 kilometers, and using fiber optic conductors, the propagation time on the link (at 20 kilometers) is approximately 100 microseconds in each direction. To minimize message latency, a minimum number of round trip acknowledgements is used. Thus, large data buffers are used for flow control.

Information is sent across an intersystem channel in frames, one example of which is depicted in FIG. 9a. A frame 900 includes a header 902, a cyclical redundancy check 904, a payload 906 and a payload cyclic redundancy check 908. Some frames do not include the payload or payload cyclic redundancy check 908. These frames are used to control the link. Frames that include the payload are for the message commands, data and responses.

Header 902 includes, for instance, a "N" field 910 (FIG. 9b) specifying a buffer set number corresponding to a buffer set that can include, for example, a MRB, a MCB and/or data; a "R" field 912 differentiating requests (outbound) from responses; and a "D" field 914 specifying a data frame, as opposed to a command or response frame. In command and response frames, an "A" bit 916 of the header indicates that there is at least one data area associated with the message, and in data frames, it indicates that more data areas are to follow. The header also includes a "S" field 918 indicating that the data frame is the first of one or more data frames for the associated data area; and a block count 920 indicating the number of 256 byte blocks in the associated data area. In one example, commands and responses are limited to one block.

One example of the flow of a message from a processor running OS/390 to a processor running coupling facility code is depicted in FIG. 10a. At a minimum, a command 1000 (referred to as a message command block (MCB)) is sent from the OS/390 processor to the coupling facility, and a response 1002 (referred to as a message response block (MRB)) is sent from the coupling facility back to the OS/390 processor. "A" bit 916 (FIG. 9b) is off in both frames because there is no data associated with either the command or the response.

The above exchange only requires a single round trip over the link, since each end of the ISC link has data buffers large enough to store the entire command and response. Assuming commands and responses that are 256 bytes and a link data transfer rate of 100 megabytes per second, the data transfer on the link takes about 5 microseconds, while the link propagation time is approximately 200 microseconds.

FIG. 10b depicts the flow of information between an OS/390 processor and the coupling facility when a write operation is requested. Initially, a message command block 1004 is sent from OS/390 to the coupling facility. Since data is to follow, the "A" bit is on. Thereafter, a write data frame 1006 is sent from the OS/390 processor to the coupling facility. In this example, the "A" bit is off, since no other data is to follow. In response, the coupling facility sends a message response block 1008 to the OS/390 processor.

In the above example, the write data frame immediately follows the MCB; no additional exchanges are required on the link before the data frame is sent. This is due to the large buffers of ISC that are capable of temporarily storing the frames until the memory addresses of the payload can be determined.

FIG. 10c depicts the flow of information between an OS/390 processor and the coupling facility when a read operation is requested. A message command block 1010 is sent from the OS/390 processor to the coupling facility. Since no data is to follow (this is a read request), "A" bit 916 is off. In response to the command, a read data frame 1012 is sent from the coupling facility to the OS/390 processor. Further, a message response block 1014 is also sent from the coupling facility. In this scenario, the "A" bit is on; however, instead of indicating that data is to follow, it is used by the link to detect whether any data frames have been lost.

The added time for data transfer, assuming 4096 bytes of data, is about 40 microseconds. Additional 4096 byte data buffers at each end of the link maintain the single round trip. As more data (greater than 4096 bytes) is required as part of the message, more buffering is required at each end of the ISC link to maintain the single round trip flow control. The expense of large buffers eventually becomes prohibitive, and the flow control is modified to add intermediate acknowledgement exchanges to throttle the data transfer preventing the buffers from overrunning. These extra exchanges, however, significantly increase message latency.

Figure 11A:
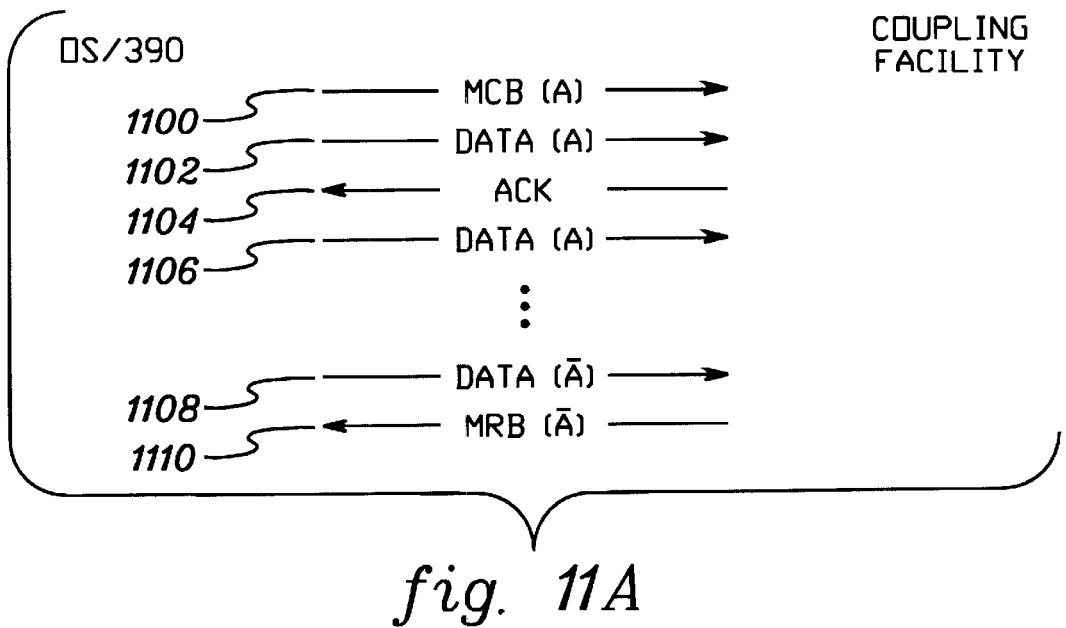
FIGS. 11a–11b illustrate additional examples of the flow of messages between an OS/390 processor and a coupling facility, in accordance with the principles of the present invention.

One example of the flow control for a write operation using intermediate acknowledgements is depicted in FIG. 11a. Initially, a message control block 1100 is sent from the OS/390 processor to the coupling facility. In this example, the "A" bit is on indicating that data is to follow. Next, a data frame 1102 is sent to the coupling facility. The data frame also has the "A" bit on instructing the other end of the link to send a link acknowledgement 1104 when the data buffer area is ready to receive the next data area. After link acknowledgement 1104 is received by the OS/390 processor, at least one other data frame is sent (e.g., data frames 1106, 1108). Since data frame 1108 has the "A" bit off, the coupling facility knows that it is the last data frame and instead of sending an acknowledgement, it sends a message response block 1110.

Figure 11B:
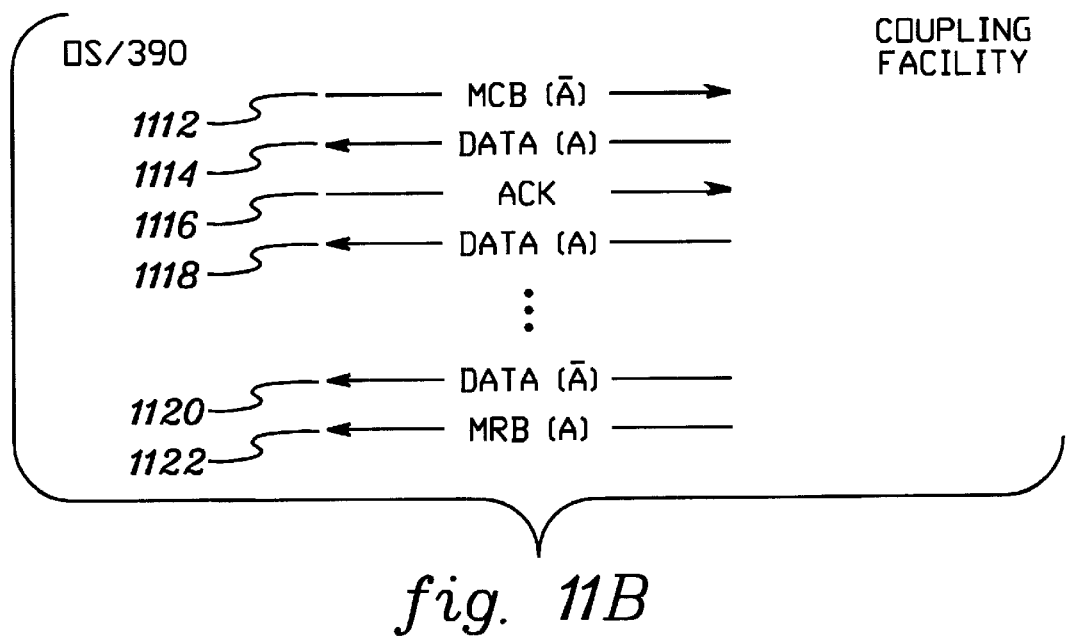

One example of the flow control for a read operation using intermediate acknowledgements is depicted in FIG. 11b. Initially, a message control block 1112 is sent from the OS/390 processor to the coupling facility. The MCB has the "A" bit off. Thereafter, the coupling facility sends back a data frame 1114. This data frame has the "A" bit on indicating that an acknowledgement is to be sent from the OS/390 processor to the coupling facility. Thus, the OS/390 processor sends an acknowledgement 1116. When the coupling facility receives this acknowledgement, it knows that it can send more data. Thus, data frame 1118 is sent. Then, when the coupling facility receives the acknowledgement for that data frame, another data frame 1120 is sent to the OS/390 processor. This data frame has the "A" bit turned off, so the next frame sent is a message response block frame 1122 from the coupling facility to the OS/390 processor.

In addition to or in lieu of the above ISC communication path between central processing complex 102 and coupling facility 104, the present invention provides another, more direct, communication path between the central processing complex and the coupling facility. This communication path is referred to as an integrated cluster bus (ICB) 134 (FIG. 1).

Integrated cluster bus 134 couples the memory bus adapter of the central processing complex with the memory bus adapter of the coupling facility over a self-timed interface link. In order for the self-timed interface to be adapted to be used as an integrated cluster bus (i.e., in order for the self-timed interface to be used as a channel), the channel functions of a direct memory adapter engine and memory protection are added to the memory bus adapter, in accordance with the principles of the present invention. Further, the STI packet definition and the STI flow control are expanded in order to accommodate the integrated cluster bus (or channel functions), as described herein.

Figure 12:
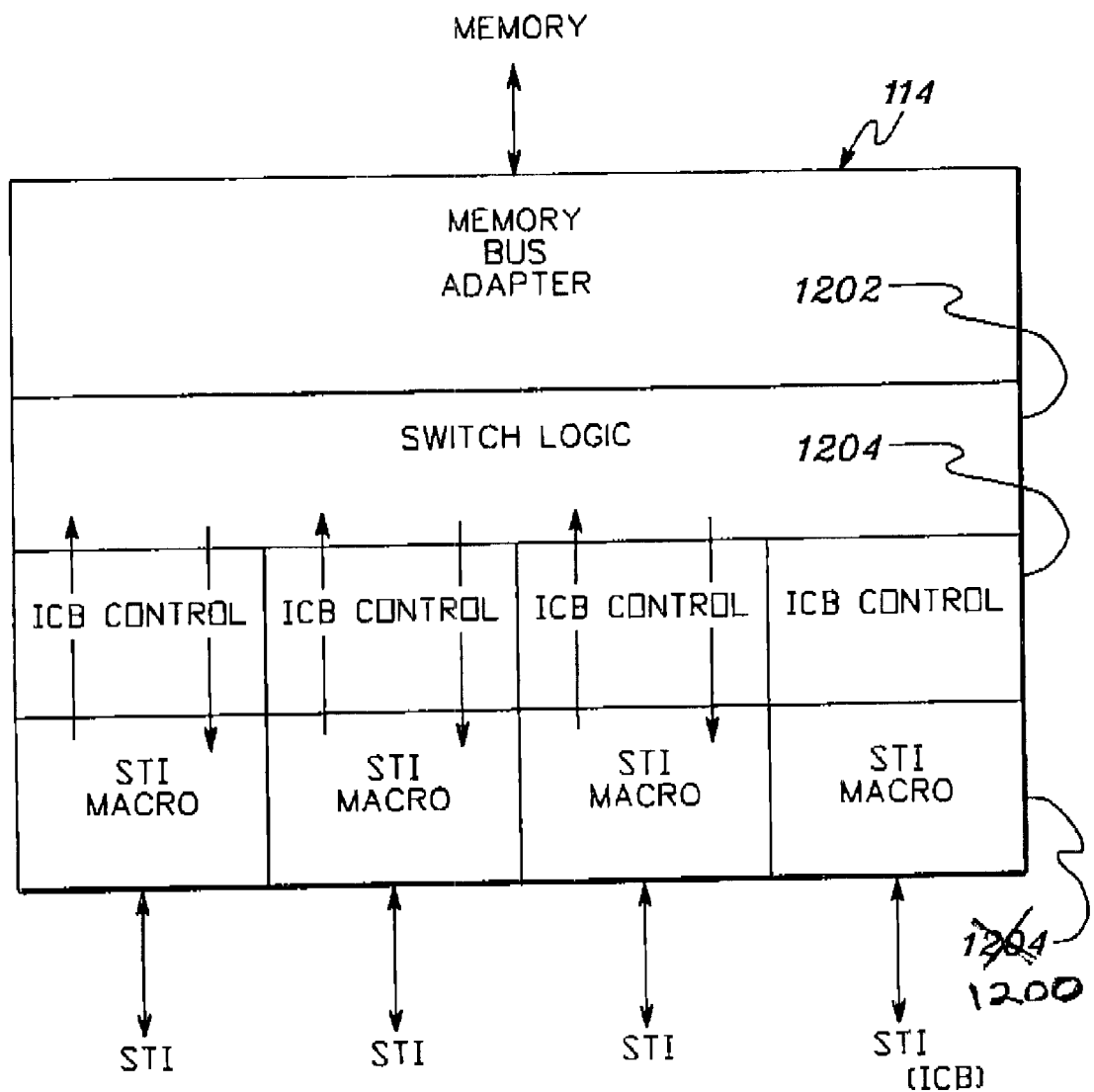
FIG. 12 depicts an example of the components of a memory bus adapter of the present invention.

The addition of control logic to the memory bus adapter 114 to support integrated cluster bus flow control is depicted in FIG. 12. As with the memory bus adapter of FIG. 2, the memory bus adapter of FIG. 12 includes STI macros 1200 and switch logic 1202, which are similar to macros 200 and logic 202, described above. However, memory bus adapter 114 of FIG. 12 also includes ICB control 1204. In this embodiment, there is an ICB control 1204 coupled to each STI macro 1200. However, for any STI link that is coupled to a channel adapter, such as adapter 118, 120, 122, the ICB control is disabled and bypassed, as shown by the arrows in FIG. 12. Thus, since only one STI link is coupled between memory bus adapters, only one of the ICB controls is enabled (no arrows going through the last ICB control).

Integrated cluster bus control 1204 is the implementation of the ICB link that couples the memory bus adapters. It includes, for instance, part of intersystem channel adapter 122 direct memory address engine (in order to emulate ISC channel adapter 122) and circuitry for a self-timed interface user layer protocol to support S/390 message passing, in accordance with the principles of the present invention. ICB control 1204 has both main attributes of a S/390 channel. It is a DMA engine and it protects memory from being arbitrarily overwritten by the attached peripherals. (An example of a DMA engine is described in co-pending, commonly assigned U.S. patent application Ser. No. 08/788,755, Gregg et al. entitled "Speeding-Up Communication Rates on Links Transferring Data Structures By a Method of Handling Scatter/Gather of Storage Blocks In Commanded Computer Systems," filed on Jan. 24, 1997, which is hereby incorporated herein by reference in its entirety.)

Figure 13:
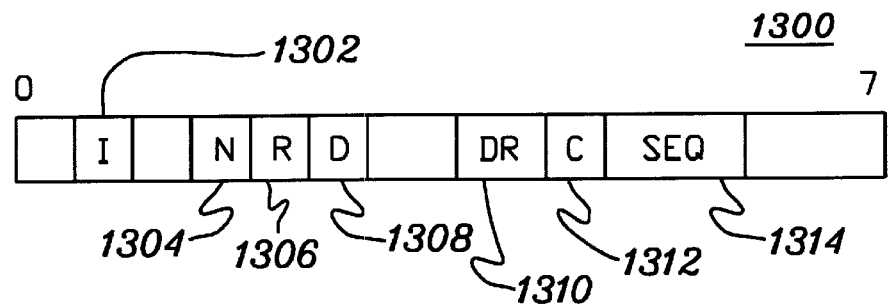
FIG. 13 depicts one example of a header used for an integrated cluster bus (ICB) flow control, in accordance with the principles of the present invention.

One example of a header used for ICB is depicted in FIG. 13. In one example, a header 1300 (which has a length of, for instance, 8 bytes) includes an "I" bit 1302 identifying the packet as an ICB packet, as opposed to other control packets used to set interrupt bits for such functions as canceling or terminating messages. If the "I" field indicates an ICB packet, then a "N" field 1304, a "R" field 1306 and a "D" field 1308 of the header are used to identify the buffer set and appropriate areas within the buffer set. In particular, "N" field 1304 specifies a buffer set number; "R" field 1306 differentiates requests (outbound) from responses; and D field 1308 specifies a data frame, as opposed to a command or response frame.

In addition to the above fields, in accordance with the principles of the present invention, ICB header 1300 also includes a DR field 1310 identifying a Data Request packet for the buffer set specified by "N" field 1304; a "C" field 1312 (continue field) indicating that more packets are to be transmitted to complete the data for the buffer area specified by "N" field 1304, "R" field 1306 and "D" field 1308; and a SEQ field 1314 providing a sequence count used to put the received packets in the correct order. The DR, C, and SEQ fields are described in further detail below.

Figure 14:
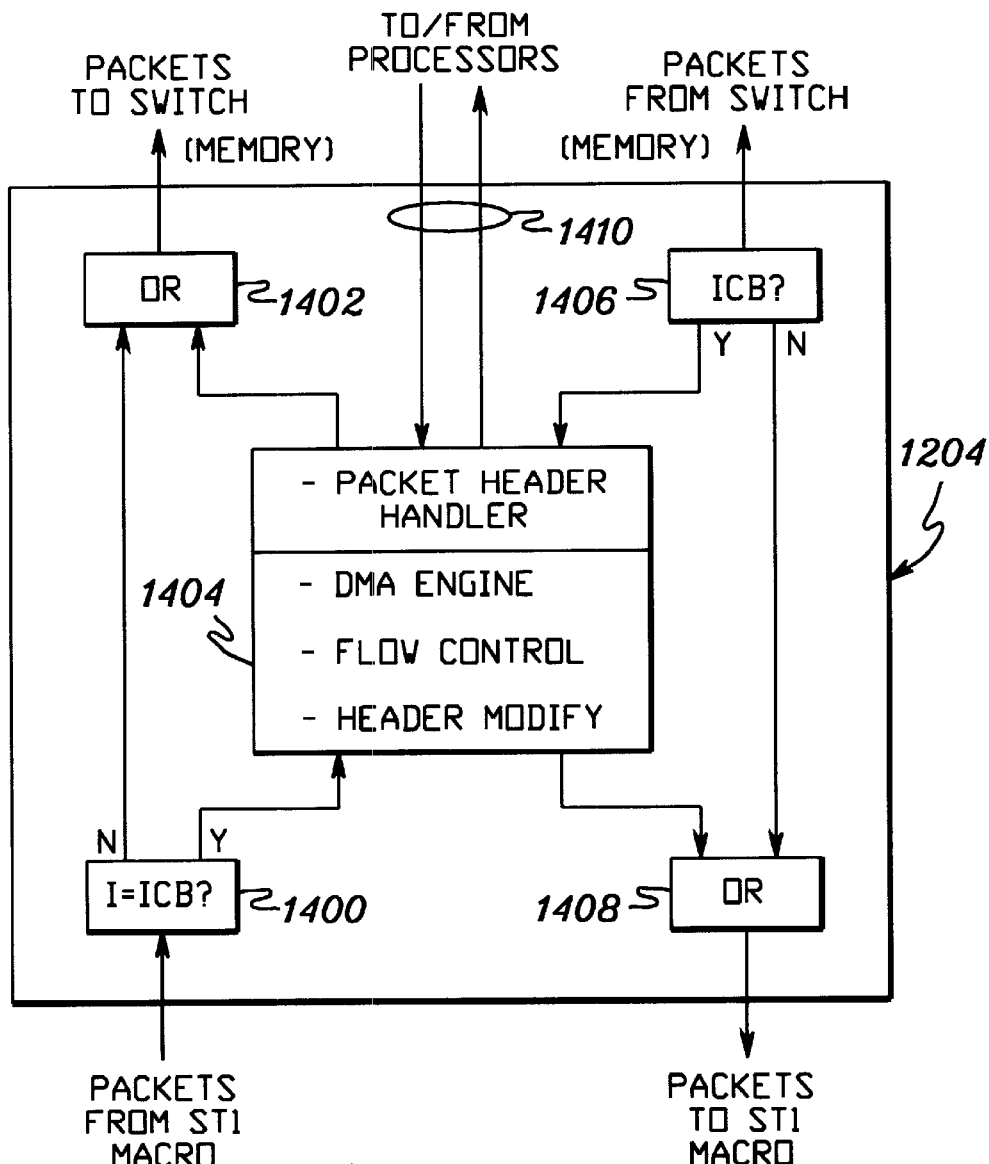
FIG. 14 depicts an example of the components of the ICB control logic depicted in FIG. 12, in accordance with the principles of the present invention.

Additional details of ICB control 1204 are described with reference to FIG. 14. In order to take advantage of ICB, the ICB control is enabled at both ends of the appropriate STI link (i.e., at the OS/390 side of the link and at the coupling facility side). When ICB is enabled, "I" field 1302 (FIG. 13) of each packet header received from the STI macro is examined by circuit 1400 of ICB control 1204. Circuit 1400 determines if the "I" field is equal to ICB.

If the "I" field is not equal to ICB, then the packet is not an ICB packet, so the packet is simply passed up to switch logic 1202 via an OR circuit 1402, where it is treated like the packets generated by channel adapters.

However, should the "I" field be equal to ICB, then the packet is an ICB packet and the header is sent to a packet header handler 1404. This circuitry includes the DMA engine, flow control logic and the memory request/response header modification logic of the present invention. This logic determines, for example, whether the ICB packet is for a MCB, MRB or data area. If it is for a MCB, MRB or data area, as indicated by "R" field 1306 and "D" field 1308, the state of the buffer area is checked to see if it is ready to accept data. Should the buffer area be ready, the ICB header is expanded to, for instance, 16 bytes, and is modified into a memory store command STI header (e.g., header 500 (FIG. 5)). The memory address is generated from address registers and control and state information in the DMA engine.

After the new header is generated, the payload is taken from the STI macro and appended to the new header by OR circuit 1402 (also referred to as a combine circuit). The ICB packet header is thus transformed into a STI memory store packet header. Since the packet sent to the MBA switch via OR circuit 1402 is a normal memory store operation, there is a response packet sent back towards the STI macro. These packets are intercepted by an ICB? circuit 1406 and sent to packet header handler 1404. These packets are not sent to the STI macro. If the memory response reason code indicates a successful operation, the DMA engine marks the memory storage operation as finished, allowing it to send another memory store operation when the next ICB packet is received. More than one memory store operation may be in process concurrently.

On the other hand, if the packet received from the switch is not an ICB packet, INQUIRY 1406, then the packet is passed on to the STI macro via OR circuit 1408.

In the outbound direction, when the packet header handler wants to send an ICB packet over STI, it first generates a memory fetch packet using memory addresses from the DMA engine. Then, it sends the memory request to the MBA switch through OR circuit 1402. When the memory response packet is detected by ICB? circuit 1406, the header is sent to the packet header handler where the "N", "R", "D", DR, "C" and SEQ fields are added to the first 8 bytes of the header. The second 8 bytes contain the memory request response code, and if this code indicates a successful memory request, the packet header handler sends the new ICB header to OR circuit 1408 followed by the payload from circuit 1406. The packet is then forwarded to the STI macro via OR circuit 1408.

In addition to the above, a connection 1410 exists between the processors and ICB control 1204, in order for the processors and ICB control to communicate more directly. This is shown in the following examples in which messages are sent via the ICB control.

Figure 15:
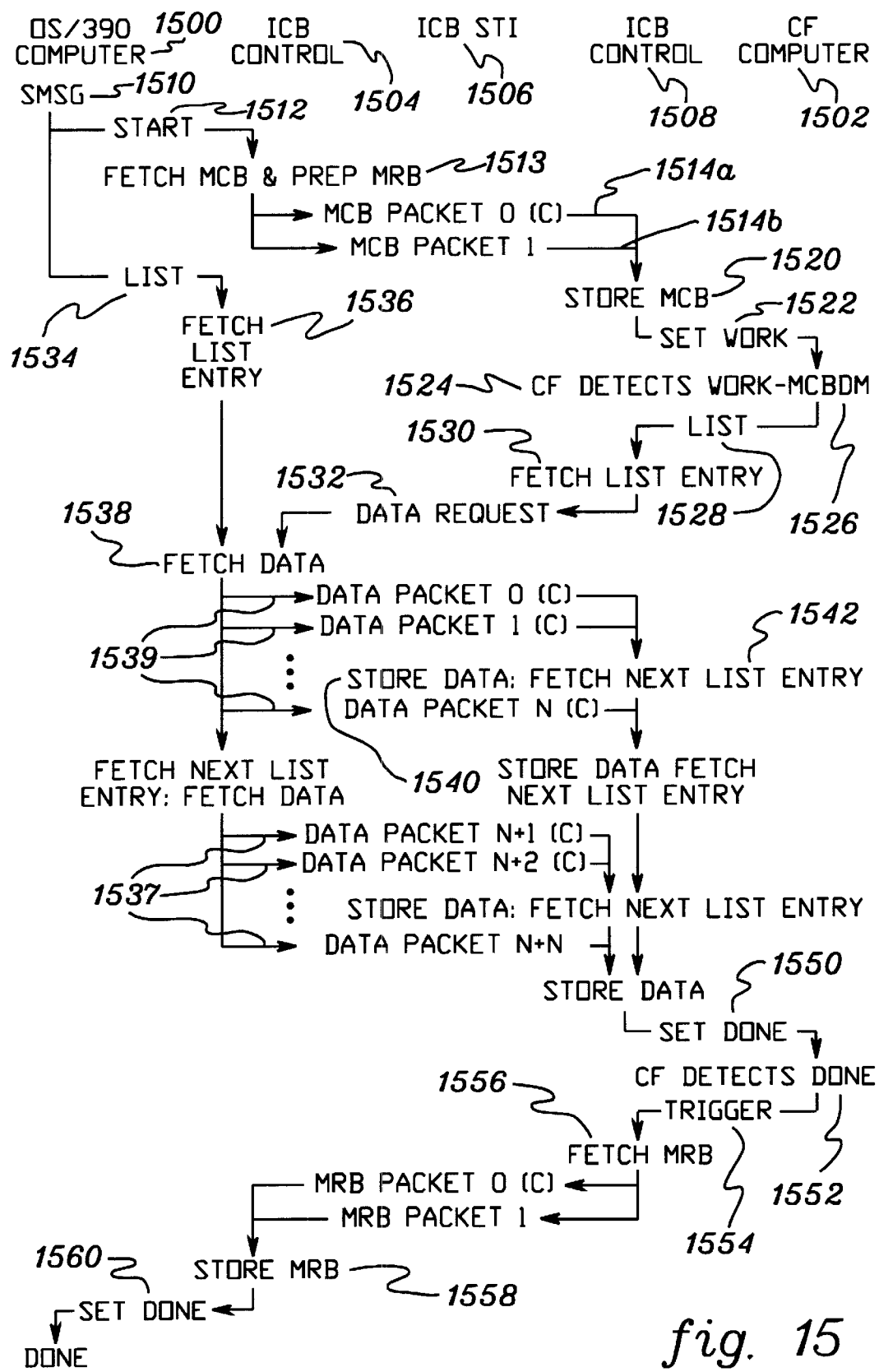
FIG. 15 depicts one embodiment of the logic associated with a write data example in which a message is sent from an OS/390 processor to a coupling facility using an integrated cluster bus, in accordance with the principles of the present invention.

FIG. 15 depicts a write data example in which a message is sent from an OS/390 processor 1500 to a coupling facility processor 1502. As described, the message proceeds from processor 1500 through ICB control 1504 over an ICB STI link 1506 and through ICB control 1508 to coupling facility processor 1502. For clarity purposes, only the ICB packets are shown in this example, as well as the example depicted in FIG. 16. The low level STI link acknowledgements are not shown.

Initially, OS/390 processor 1500 sends a message by issuing a Send Message (SMSG) instruction 1510, which causes a start command to be sent to ICB control 1504, STEP 1512. This command instructs the ICB control to fetch the MCB and send it over ICB STI 1506 in one or more packets, and to begin preparing the MRB, STEP 1513. (One example of preparing the MRB is described in detail in co-pending, commonly assigned U.S. patent application Ser. No. 08/864,583, Gregg et al., entitled "Intersystem Advanced Mode Sending Method and Mechanism", filed May 28, 1997, which is hereby incorporated herein by reference in its entirety.)

In this example, two MCB packets 1514a, 1514b are used, each having a maximum of 128 bytes of data. The "C" bit in MCB packet 1514a indicates to the control logic that another packet is forthcoming. ICB control 1508 receives the packets via ICB STI link 1506 and stores them, STEP 1520. It also indicates to the coupling facility that work is to be performed, STEP 1522.

After the MCB packets have been received by coupling facility processor 1502, the coupling facility code detects the command and determines whether or not there is write data associated with the command, STEP 1524. Should there be write data, as in this case, the data packets are not sent to the coupling facility until the coupling facility code is ready to receive them (e.g., has determined the memory addresses). This is because the STI links do not have the expense and complexity of large buffers. Without the large buffers, the data packets cannot be sent until the coupling facility is ready.

When the coupling facility code receives the MCB packets and determines there is write data, the coupling facility code determines the memory addresses for the data and issues a Move Channel Buffer Data Multiple (MCBDM) instruction to move the data, STEP 1526. The code that performs the MCBDM instruction sends a read list command 1528 to ICB control 1508. (The fetching of addresses for data areas is further described in co-pending, commonly assigned U.S. patent application Ser. No. 08/788,755, Gregg et al. entitled "Speeding-Up Communication Rates on Links Transferring Data Structures By a Method of Handling Scatter/Gather of Storage Blocks In Commanded Computer Systems," filed on Jan. 24, 1997, which is hereby incorporated herein by reference in its entirety.) The ICB control then fetches the first address in the list, STEP 1530, and sends a Data Request Over STI 1506 to ICB control 1504, STEP 1532.

In addition to the above, when the SMSG instruction is issued, the code on the OS/390 processor sends a write list command to ICB control 1504, if data transfer is required as part of the message, STEP 1534. If no data is associated with the message, the list command is not issued to the ICB control and, therefore, no data packets are sent over STI. However, as a result of the write list command, ICB control 1504 fetches the first entry in the list of addresses pointing to the data to be moved, STEP 1536.

After ICB control 1504 has received the write list command from processor 1500 and has fetched the first address in the list, and after ICB control 1504 has received the Data Request packet from the other end of the STI, ICB control 1504 can proceed to transmit data packets. (The Data Request packet can be received before or after ICB control 1504 has fetched the first address of the list.) In particular, ICB control 1504 fetches data from the memory addresses that are provided, STEP 1538, and places the data in one or more data packets, which are transmitted from ICB control 1504 to ICB control 1508, STEP 1539. When ICB control 1508 receives the packets, it stores them, STEP 1540, and fetches the next list entry, STEP 1542. The ICB control knows there is more data to be fetched, since the "C" bit is on in the last data packet received. Processing then continues, as described above.

When there is no more data to be stored (the "C" bit of the last data packet is off indicating the end of a buffer area), ICB control 1508 indicates completion, STEP 1550, which is detected by the coupling facility, STEP 1552. Thus, the coupling facility triggers ICB control 1508 to fetch an MRB, STEP 1554. The ICB control fetches the MRB, STEP 1556, and transmits one or more MRB packets to ICB control 1504. ICB control 1504 receives the packets and stores them, STEP 1558. When ICB control 1504 detects that it has received all of the MRB packets, it sends a done indication to the OS/390 processor, STEP 1560.

Figure 16:
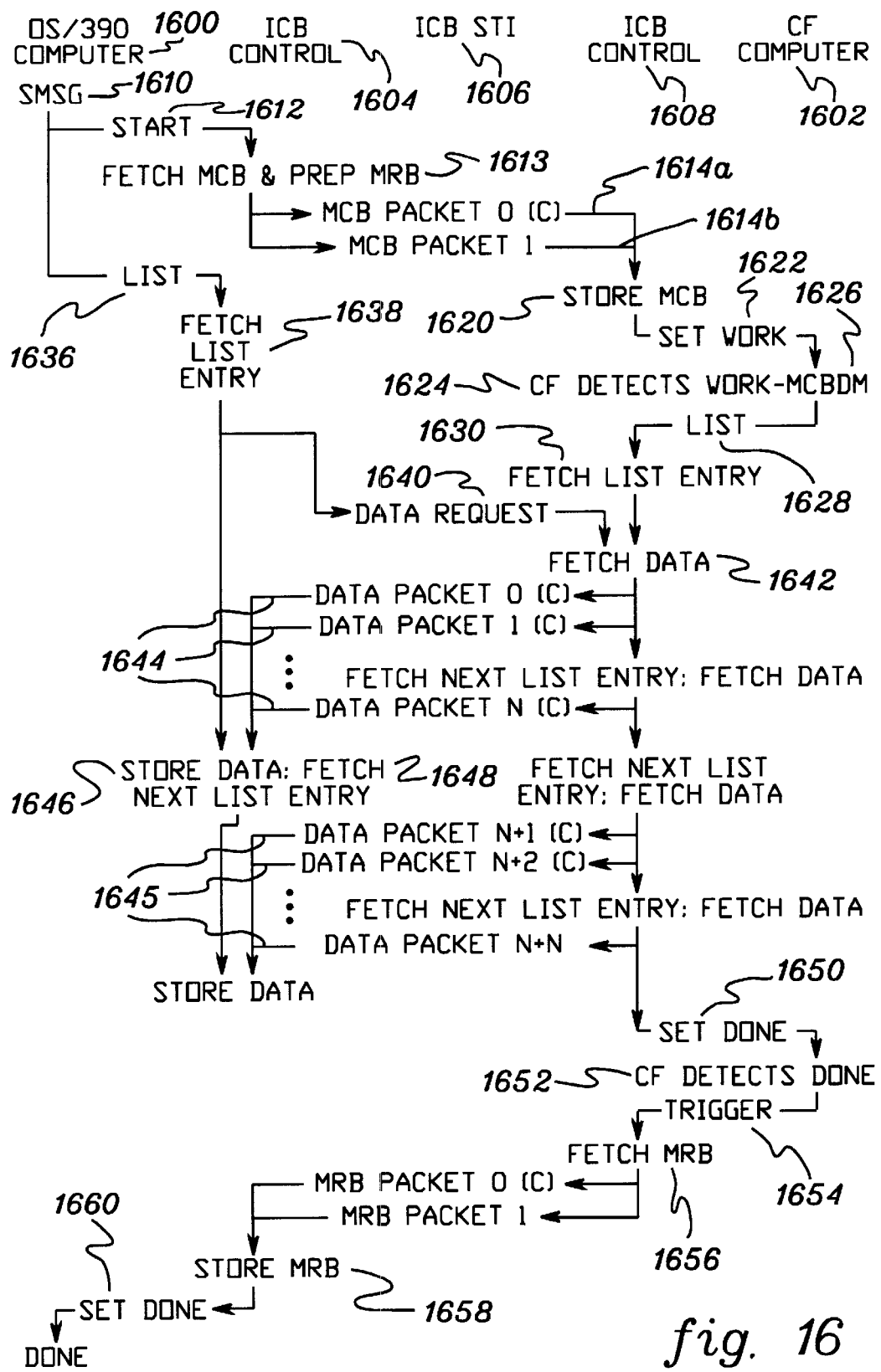
FIG. 16 depicts one embodiment of the logic associated with a read data example in which a message is sent from an OS/390 processor to a coupling facility using an integrated cluster bus, in accordance with the principles of the present invention.

FIG. 16 depicts a read data example in which a message is sent from an OS/390 processor 1600 to a coupling facility processor 1602. As described, the message proceeds from processor 1600 through ICB control 1604 over an ICB STI link 1606 and through ICB control 1608 to coupling facility processor 1602. Again, for clarity purposes, only the ICB packets are shown in this example.

Initially, OS/390 processor 1600 sends a message by issuing a Send Message (SMSG) instruction 1610, which causes a start command to be sent to ICB control 1604, STEP 1612. This command instructs the ICB control to fetch the MCB and send it over ICB STI 1606 in one or more packets, and to begin preparing the MRB, STEP 1613. In this example, two MCB packets 1614a, 1614b are used, each having a maximum of 128 bytes of data. ICB control 1608 receives the packets and stores them, STEP 1620. It also indicates to the coupling facility that work is to be performed, STEP 1622.

After the MCB packets have been received by coupling facility processor 1602, the coupling facility code detects the command, STEP 1624, determines the memory addresses for the data and issues a Move Channel Buffer Data Multiple (MCBDM) instruction to move the data, STEP 1626. The code that performs the MCBDM instruction sends a write list command to ICB control 1608, STEP 1628. The ICB control then fetches the first address in the list, STEP 1630.

In addition to the above, when the SMSG instruction is issued, the code on the OS/390 processor sends a read list command to ICB control 1604, STEP 1636. As a result of the read list command, ICB control 1604 fetches the first entry in the list of addresses pointing to the data to be moved, STEP 1638. Further, it sends a Data Request packet to the other end of the STI, STEP 1640.

After ICB control 1608 has fetched the first address in the list, and after it has received the Data Request packet from the other end of the STI, ICB control 1608 can proceed to transmit data packets. (The Data Request packet can be received before or after ICB control 1608 has fetched the first address of the list.) In particular, ICB control 1608 fetches data from the memory addresses that are provided, STEP 1642, and places the data in one or more data packets, which are transmitted from ICB control 1608 to ICB control 1604, STEP 1644. When ICB control 1604 receives the packets, it stores them, STEP 1646, and fetches the next list entry, STEP 1648. Processing then continues, as described above.

When there is no more data to be fetched, ICB control 1608 indicates completion, STEP 1650, which is detected by the coupling facility, STEP 1652. Thus, the coupling facility triggers ICB control 1608 to fetch an MRB, STEP 1654. The ICB control fetches the MRB, STEP 1656, and transmits one or more MRB packets to ICB control 1604. ICB control 1604 receives the packets and stores them, STEP 1658. When ICB control 1604 detects that it has received all of the MRB packets, it sends a done indication to the OS/390 processor, STEP 1660.

Figure 17:
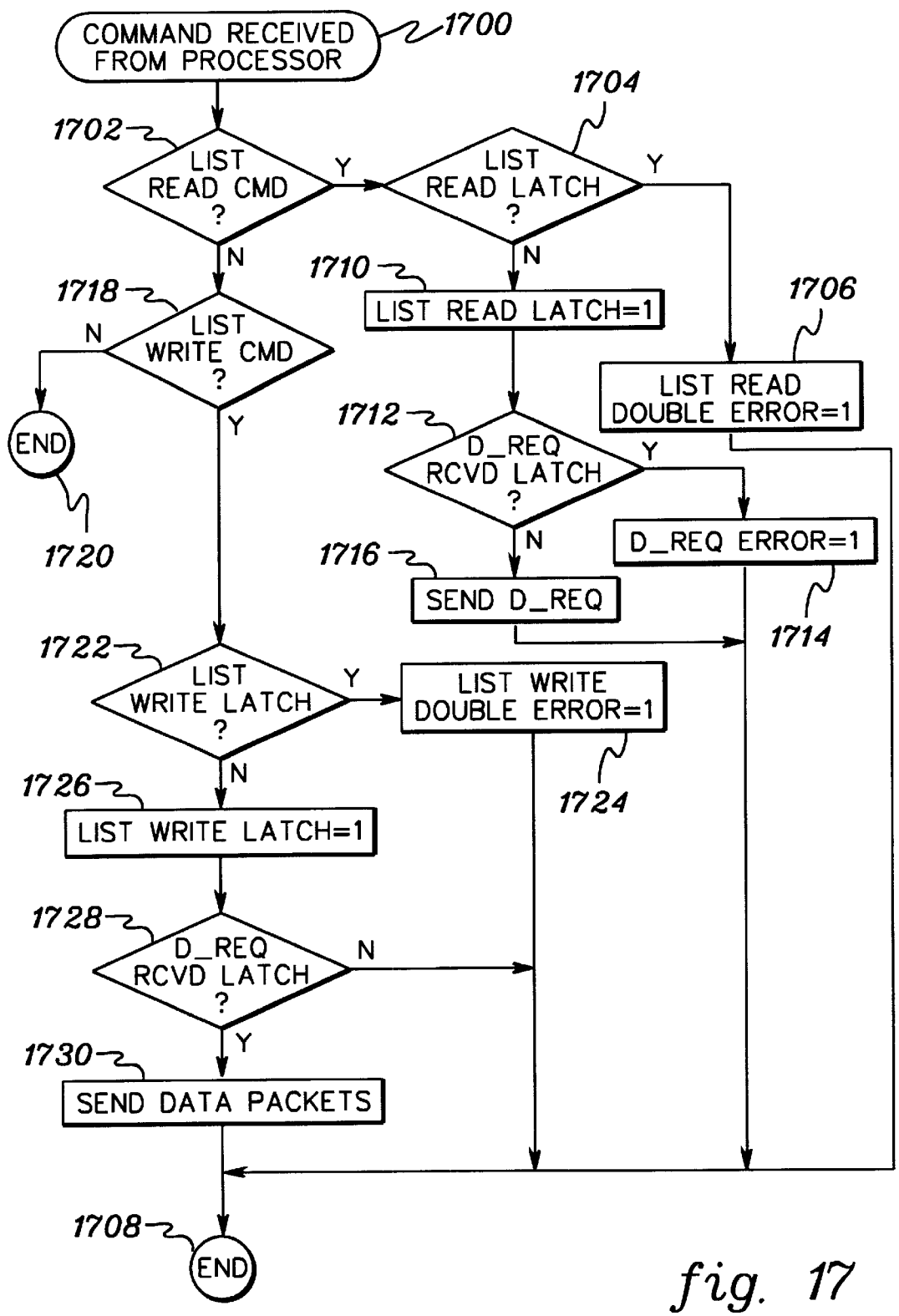
FIG. 17 depicts one embodiment of the logic associated with error checking performed when a command is received by a processor, in accordance with the principles of the present invention.

In the examples described above, the ICB control logic is responsible for performing a number of functions, including, for instance, executing list commands and interpreting Data Request and data packets. Additionally, the ICB control logic is responsible for determining various error conditions. Further details of how these functions are performed by the ICB control logic on both sides of the link (e.g., sender and receiver) are described in detail with reference to FIG. 17.

In one example, initially, a command is received by the ICB control from an OS/390 processor via connection 1410 (FIG. 14), STEP 1700. This command is checked to determine whether it is a read list command, INQUIRY 1702. When a list command for a read operation is received, a LIST READ LATCH located in the ICB control is tested to see if a list command for a read operation has already been received, INQUIRY 1704. If a read list command has already been received, then an error, referred to as a LIST READ DOUBLE ERROR, is set, STEP 1706 and processing is complete, STEP 1708.

If, however, the LIST READ LATCH indicates that a read list command has not previously been received, then the LIST READ LATCH is set (e.g., set to one), STEP 1710, and a further determination is made as to whether a Data Request packet has previously been received, INQUIRY 1712. In one example, this determination is made by checking a D_REQ RCVD LATCH located in the ICB control. Since this is a read operation, a Data Request packet should not have been received. Thus, if the latch indicates one has been received, than a D_REQ ERROR is set to one, STEP 1714, and processing is complete, STEP 1708.

If a Data Request packet has not been received, the ICB control logic sends a Data Request packet to the other end of the link, STEP 1716, and processing is once again complete, STEP 1708.

Returning to INQUIRY 1702, if the list command is not for a read operation, then a determination is made as to whether the command is for a write operation, INQUIRY 1718. If the list command is not for a read or write operation, then processing completes, STEP 1720. On the other hand, if the list command is for a write operation, then a LIST WRITE LATCH is tested to determine whether a list command for a write operation has already been received, INQUIRY 1722.

Should a write list command have previously been received, then a LIST WRITE DOUBLE ERROR is set (e.g., to one), STEP 1724, and processing is complete, STEP 1708. However, if a list command for a write operation has not been received, then the LIST WRITE LATCH is set to one, STEP 1726, and the D_REQ RCVD LATCH is tested, INQUIRY 1728.

If a Data Request packet is received, then processing continues by sending the data packets to the other end of the link, STEP 1730. However, if a Data Request packet has not been received, then processing ends, STEP 1708.

Figure 18:
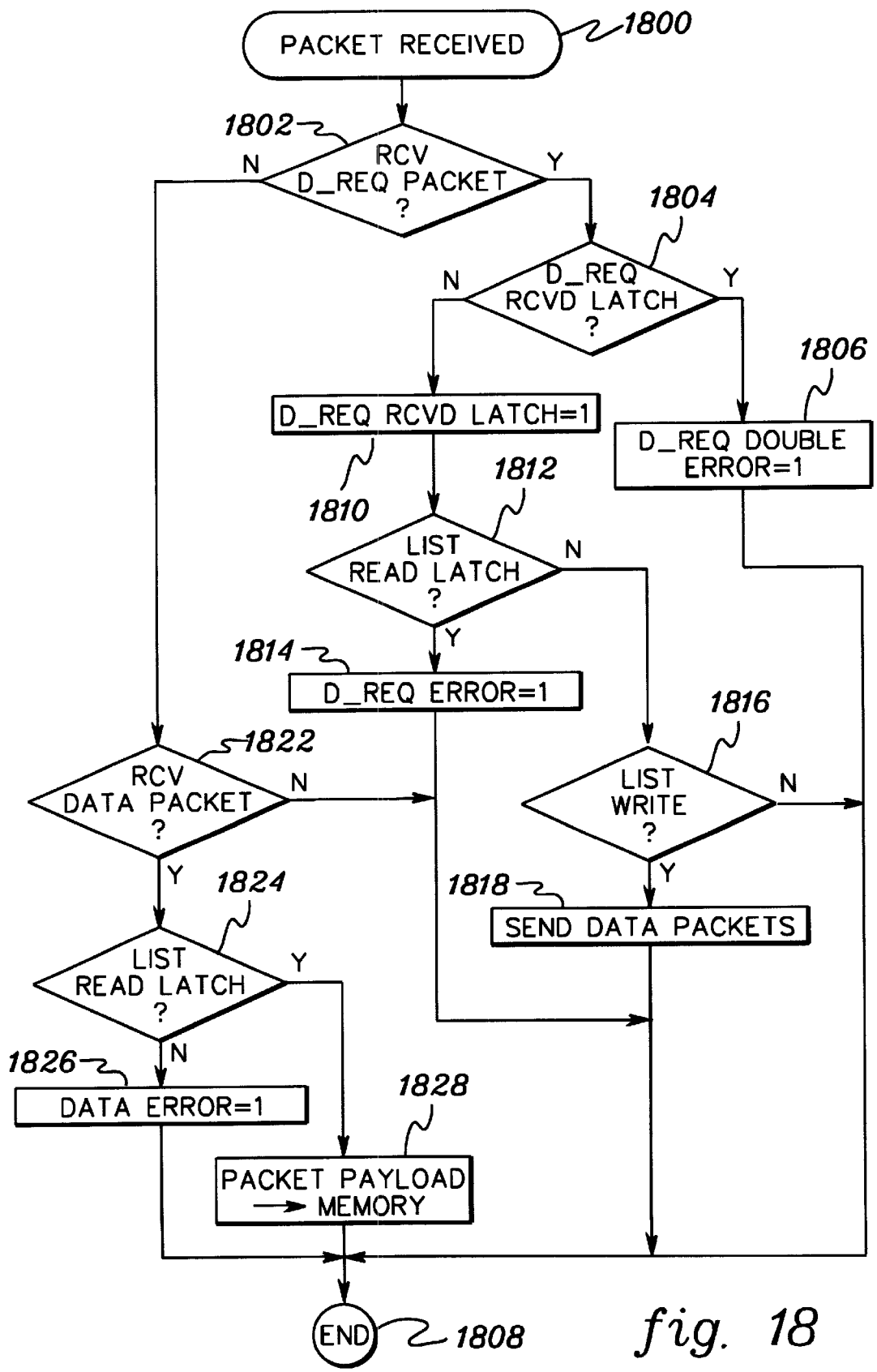
FIG. 18 depicts one embodiment of the logic associated with error checking performed when a packet is received over an ICB self-timed interface link, in accordance with the principles of the present invention.

When an ICB packet is received by the ICB control logic, STEP 1800 (FIG. 18), it is tested to determine if it is a Data Request packet, INQUIRY 1802. If the "DR" field of the header indicates that the packet is a Data Request packet, then the D_REQ RCVD LATCH is tested to determine if a Data Request packet was previously received, INQUIRY 1804. Should the latch be set, then D_REQ DOUBLE ERROR is set to one, STEP 1806, and processing is complete, STEP 1808.

On the other hand, if the D_REQ RCVD LATCH is not set, then the latch is set, STEP 1810, and a LIST READ LATCH is then tested, INQUIRY 1812. If the LIST READ LATCH is set indicating that this is a read operation, then a D_REQ ERROR is set, since a Data Request packet should not have been received, STEP 1814. Processing is then complete, STEP 1808.

If, however, the list read latch is not set, then a determination is made as to whether a write operation is in progress, INQUIRY 1816. This determination is made by checking the LIST WRITE LATCH. If it is set, then a write operation is in progress. When a write operation is in progress, the ICB control logic starts sending data packets, STEP 1818. When the LIST WRITE LATCH is not set, then processing ends.

Returning to INQUIRY 1802, if the received packet is not a Data Request packet, then a determination is made as to whether the packet is a data packet, INQUIRY 1822. If the packet is not a data packet, then processing ends. However, if the packet is a data packet, then the LIST READ LATCH is checked to determine if a read operation is in progress, INQUIRY 1824. When a read operation is not in progress, a DATA ERROR is set, since data is being received prior to sending the Data Request packet, STEP 1826.

However, if a read operation is in process, then the packet payload is sent to memory, STEP 1828, and processing is complete, STEP 1808.

In addition to the above-described error checking, the ICB control logic also detects protocol errors involving the "C" bit of the ICB headers. As described above, this bit is used to indicate an end of a buffer area. That is, for MCB, MRB, or data areas, the "C" bit is used to determine the length of those areas. If the bit is on, more data is to follow. If it is off, there is no more data and the end of a buffer area is indicated. (In this embodiment, no other fields are necessary to indicate the length of a buffer area, since the low level STI guarantees delivery of all packets.)

Based on the foregoing, once a packet is received with its "C" bit off, the MCB, MRB, or data buffer area state is set to full. If another packet is received for a full buffer area, a C bit protocol error is set. The full state is reset at the beginning of the next message.

In accordance with the principles of the present invention, ICB data transfer does not pair each sent packet with a response packet. Thus, the bandwidth required for response packets in other data transfer modes (e.g., channel adapters) is not needed. Therefore, this bandwidth is used to send more payload information. As a result, the ICB packets are streamed together, and the arrival order is important in determining where in memory each packet payload is stored.

The in-order packet arrival of STI is disturbed by STI's automatic packet retry. Through the use of negative acknowledgements, the STI macros resend damaged or lost packets, and because multiple packets and their link acknowledgements can exist on the link at the same time, the apparent order of the arrived packets to the ICB control may not be in the same order that the packets were transmitted.

Thus, in accordance with the principles of the present invention, the STI headers for ICB include a SEQ field 1314 (FIG. 13) to determine the order of the STI packets. When the ICB control sends a packet to the STI macro, it places the contents of its sequence counter in the SEQ field of the header and increments the counter. Each time a packet is received, the ICB control compares the SEQ field to its sequence counter. If the counts are the same, the packet is moved from the STI macro to memory at the next address. If the counts are not the same (because a packet was resent), the ICB control leaves the packet in the STI macro and waits for the next packet to be received. The payload of the next packet is then stored in memory, and the ICB control compares the sequence counts of the previously received packet. It expects, in this embodiment, that this time it will be the same, since no more than two packets are sent at any one time. The packet is then stored in memory, and the sequence counter is again incremented.

Figure 19:
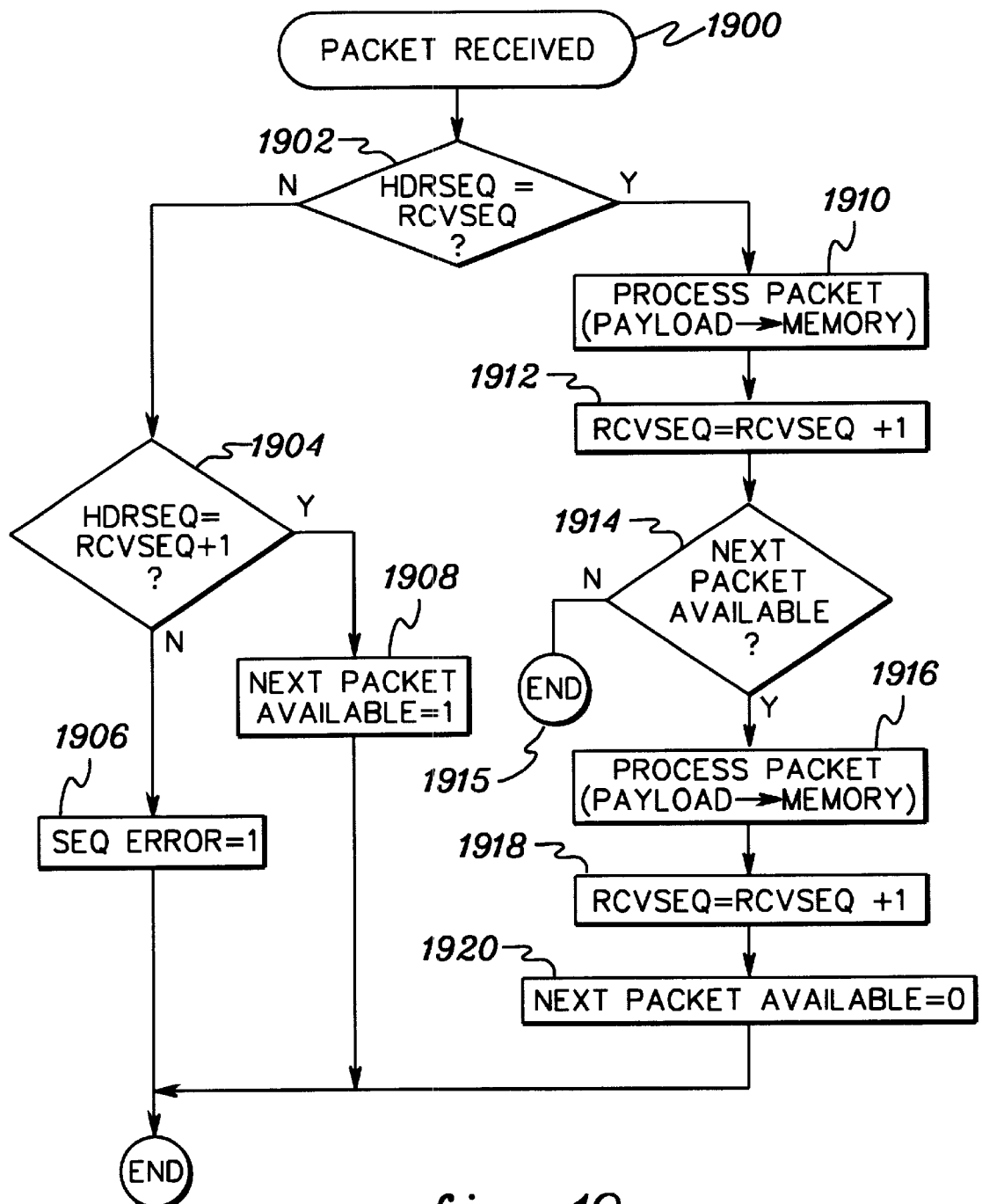
FIG. 19 depicts one embodiment of the logic associated with sequence error checking performed when a packet is received over an ICB self-timed interface link, in accordance with the principles of the present invention.

Further details of the sequence number handling is described below with reference to FIG. 19. When a packet is received off the link by the STI macro, STEP 1900, SEQ field 1314 in the header (referred to in FIG. 19 as HDRSEQ) is compared to the receiver's sequence count (RCVSEQ), INQUIRY 1902. If the counts do not match, then the control logic determines whether the header sequence count is one more than the receiver's sequence count, INQUIRY 1904.

When the header sequence count is not one more than the receiver's count, a SEQ ERROR is set, STEP 1906. However, if the header sequence count is one more than the receiver's sequence count, then the packet is left in the STI macro packet buffer, and the ICB control sets a NEXT AVAILABLE PACKET indicator to one indicating a packet is waiting to be processed, STEP 1908.

Returning to INQUIRY 1902, if the counts match, the packet is processed, STEP 1910. For example, the payload is transmitted to memory. Additionally, the receiver's sequence count is incremented by one, STEP 1912.

Thereafter, the ICB control logic checks the NEXT PACKET AVAILABLE indicator to determine if a previously out of sequence packet is in the STI macro packet buffer, INQUIRY 1914. If there is no out of sequence packet, then processing ends, STEP 1915. However, if a packet is out of sequence, then that packet is processed by sending the payload to memory, STEP 1916. Additionally, RCVSEQ is incremented by one, STEP 1918, and NEXT PACKET AVAILABLE is reset to zero, STEP 1920.

In an alternate embodiment, the SEQ field in the header can be used to modify or calculate the memory address to store the payload of the packet for a MCB, MRB or data area. In this embodiment, the ICB control keeps track of which payloads are stored to ensure that there are no holes in the data area in memory. If the packet is a Data Request packet, the packet can be processed immediately, since ordering of this packet with respect to other ICB packets is not necessary.

While the ICB control sequence numbers keep ICB packets in the correct order, the other control packets (indicated by "I" bit 1302 (FIG. 13) in the header set to zero) that bypass the ICB control logic are to be ordered with respect to the ICB packets. For example, if a message is to be canceled, terminated or withdrawn by the sender, the control packet initiating the cancel operation cannot get ahead of the message. As shown above, the resending of damaged packets may allow the control packet to get ahead of the message. The sequence numbers in the ICB message packets are not used by the control packets. A quiesce function in the ICB control logic is provided to keep control packets in the correct order. Before the code issues a control packet, it commands the ICB control logic to quiesce and restart the link. When the quiesce command is received by the ICB control logic, it quits sending packets and waits for all outstanding packets to be acknowledged at the STI link level. Once the ICB packets are all acknowledged, the ICB control logic knows that there are no damaged or lost packets being resent by the STI macros. As soon as the ICB control logic detects that all packets have been acknowledged, it resumes sending more packets. After the code detects that the quiesce operation has completed, it knows that it can send a control packet. The quiesce function provides a serialization point for the cancel operation.

Figure 20:
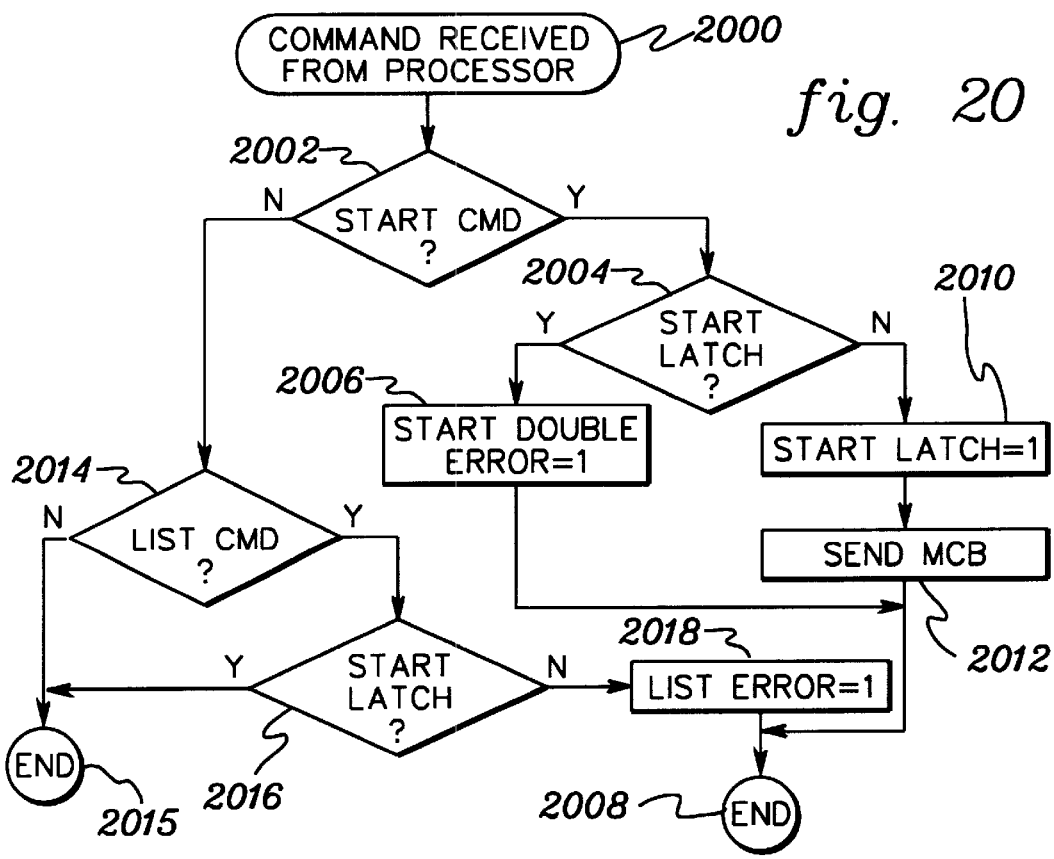
FIG. 20 depicts one embodiment of the logic associated with checking the order of commands received from processors, in accordance with the principles of the present invention.

The ICB control logic has additional state machines for checking the order of commands received from processors, which is described with reference to FIG. 20.

Initially, the ICB control logic receives a command from a processor, STEP 2000, and that command is tested to determine whether it is a start command, INQUIRY 2002. If it is a start command, a START LATCH is tested to determine whether a start command has already been received, INQUIRY 2004. When a start command has already been received, then a START DOUBLE ERROR is set, STEP 2006, and processing is complete, STEP 2008.

However, if a start command has not been previously sent, then the START LATCH is set, STEP 2010, and the MCB is sent to the other end of the link, STEP 2012.

Returning to INQUIRY 2002, if the command from the processor is not a start command, then a determination is made as to whether the command is a list command (read or write operation), INQUIRY 2014. If the command is not a list command, then processing ends, STEP 2015. However, if the command is a list command, the START LATCH is tested to make sure it is on before the list command is received, INQUIRY 2016. When the START LATCH is on, processing ends, STEP 2015. On the other hand, when it is not on, a LIST ERROR is set, STEP 2018, and then, processing is complete, STEP 2008.

Figure 21:
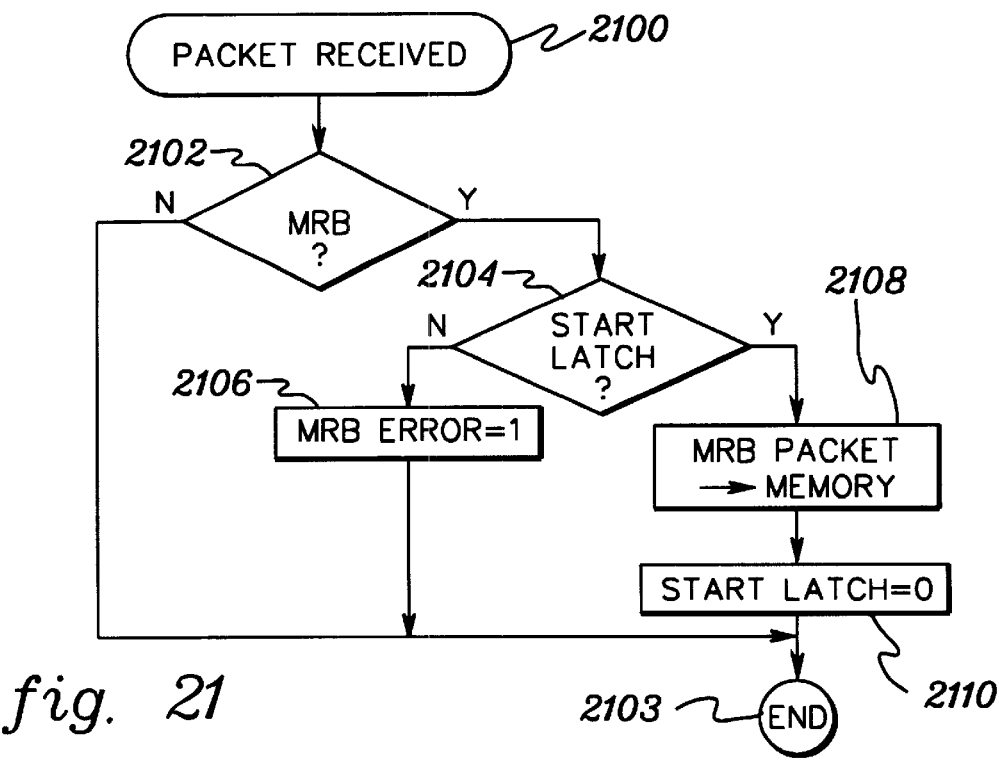
FIG. 21 depicts one embodiment of the logic associated with checking the order of packets received over a link, in accordance with the principles of the present invention.

Further, the ICB control logic has additional state machines for checking the order of packets received from the other end of the link, which is described with reference to FIG. 21.

When a packet is received by the ICB control logic, STEP 2100, a determination is made as to whether the packet is a MRB, INQUIRY 2102. If the received packet is not a MRB, processing ends, STEP 2103. However, if the received packet is a MRB, the START LATCH is tested, INQUIRY 2104. Should the latch be off, then MRB ERROR is set, STEP 2106. However, if it is on, the MRB packet payload is sent to memory, STEP 2108, and the START LATCH is set to zero, STEP 2110.

It will be apparent to those skilled in the art that although a single buffer set is described above, multiple buffer sets may be transferring packets in an interleaved or multiplexed fashion. Each buffer set has separate state machines and controls that operate independently.

Described in detail above are ways to control the flow of information over a link that is being used as a channel. One technique described is the addition of a Data Request packet that lets the sender know when the receiver is ready to receive the data. Advantageously, the exchange of the Data Request packets does not significantly add to message latency, since, in the above examples, STI distances are limited to about 10 meters. Further, these packets are processed by fast hardware state machines located in the ICB control.

Without the Data Request packets, the throughput over STI would be greatly reduced. For example, in the write example described with reference to FIG. 15, if ICB control 1504 started to immediately send data packets after it received the list command (1534) from processor 1500, the first two data packets sent on STI would be buffered in the STI macro at the coupling facility end of the STI. These packets could not be moved to memory, since the address (es) is not yet known. Thus, all other traffic for all other buffer sets would stop, waiting for these two data packets to be stored. Eventually, the coupling facility code would detect the command, determine the address(es), and send the list command to ICB control 1508. Only then could the contents of the STI macro data buffers be stored in memory, freeing them for the transfer of more packets. It typically takes several tens of microseconds for the coupling facility code to detect the message command and determine the memory addresses. At STI speeds of hundreds of bytes per microsecond, many thousands of bytes of bandwidth would be wasted by each message. Without the Data Request protocol, the throughput of ICB suffers greatly.

In ICB, the link acknowledgement sequence shown in FIGS. 11a–11b for ISC is eliminated. The low level flow control is the STI macro buffer acknowledgements. Any number of data packets can be transferred without the higher level link acknowledgements required by ISC. For example in FIG. 15, the first data area is transmitted by data packets 1539, and the second data area is transmitted by data packets 1537. There is no higher level link acknowledgement between those data areas. The same situation exists for the read operation of FIG. 16, where there is no higher level link acknowledgement between data area packets 1644 and 1645.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of controlling the flow of information between senders and receivers of data, said system comprising:
   initiating, by a first system a sending of a request, via a link, to a second system, said request having one or more data items associated therewith, wherein none of the one or more data items is sent with the request;
   indicating that a receiver of data is prepared to receive said one or more data items from a sender of data, wherein said receiver is one of said first system and said second system depending on said request, and said sender is the other of said first system and said second system;
   forwarding, in response to said indicating, said one or more data items; and wherein said link is being used as a channel in that the link is not stopped while said receiver is preparing for said one or more data items.

2. The method of claim 1, wherein said indicating comprises sending a data request indication from a receiver control logic coupled to said receiver to a sender control logic coupled to said sender.

3. The method of claim 2, further comprising:

determining, by said sender control logic, whether another data request indication has been previously received for said request; and indicating an error when another data request indication has been previously received.

4. The method of claim 2, further comprising:

determining whether said request specifies a read operation;

determining whether a data request indication is received by said receiver control logic for said request; and indicating an error when said request specifies a read operation and said data request indication is received by said receiver control logic.

5. The method of claim 2, wherein said forwarding comprises forwarding said one or more data items from said sender control logic to said receiver control logic.

6. The method of claim 5, further comprising storing, by said receiver control logic, said one or more data items at said receiver.

7. The method of claim 5, wherein said forwarding said one or more data items comprises using one or more data packets to forward said one or more data items, and wherein a continuing indicator set in one of said one or more data packets indicates another data packet is to follow.

8. The method of claim 7, further comprising including in at least one data packet of said one or more data packets at least one sequence number usable in maintaining delivery order of said at least one data packet.

9. The method of claim 1, further comprising:

issuing, by said sender, a command to obtain an address of one of said one or more data items to be forwarded;

determining whether said command has been previously issued for said request; and indicating an error when said command has been previously issued for said request.

10. The method of claim 9, further comprising:

determining whether a start command has been issued prior to said command to obtain said address; and indicating an error when said start command has not been issued prior to said command.

11. The method of claim 1, further comprising:

determining whether any of said one or more data items has been forwarded prior to indicating said receiver is ready to receive said one or more data items; and indicating an error when any of said one or more data items has been forwarded prior to indicating said receiver is ready to receive said one or more data items.

12. The method of claim 1, wherein said initiating comprises causing a start command to be issued, and wherein said method further comprises:

determining whether another start command has been previously issued for said request; and indicating an error when said another start command has previously been issued.

13. The method of claim 1, further comprising:

issuing, by said receiver, a command to obtain at least one memory address of said receiver;

determining whether said command has been previously issued for said request; and indicating an error when said command has been previously issued for said request.

14. The method of claim 13, further comprising:

determining, after said command is issued, whether control logic of said receiver has received a data request indication; and indicating an error when said control logic has received said data request indication.

15. The method of claim 13, further comprising:

determining whether a start command has been issued prior to said command to obtain said at least one memory address; and indicating an error when said start command has not been issued prior to said command.

16. The method of claim 1, further comprising:

sending, by said second system to said first system, an indication that the request is complete;

determining whether a start command for said request was issued by said first system prior to the sending of the complete indication; and indicating an error when said start command has not been issued prior to the sending of the complete indication.

* * * * *